(12) United States Patent
Matsumoto et al.

(10) Patent No.: US 6,757,953 B2
(45) Date of Patent: Jul. 6, 2004

(54) METHOD FOR FORMING AN END OF SLIDE FASTENER CHAIN

(75) Inventors: Masao Matsumoto, Toyama-ken (JP); Kazuki Kuse, Toyama-ken (JP); Hideo Shimai, Toyama-ken (JP); Mitsuru Yamakawa, Toyama-ken (JP)

(73) Assignee: YKK Corporation, Tokyo (JP)

( * ) Notice: Subject to any disclaimer, the term of this patent is extended or adjusted under 35 U.S.C. 154(b) by 143 days.

(21) Appl. No.: 10/102,665

(22) Filed: Mar. 22, 2002

(65) Prior Publication Data

US 2002/0121006 A1 Sep. 5, 2002

Related U.S. Application Data

(62) Division of application No. 09/550,221, filed on Apr. 14, 2001, now Pat. No. 6,427,295.

(30) Foreign Application Priority Data

Apr. 22, 1999 (JP) .............................. 11-115078
Mar. 10, 2000 (JP) ......................................... 2000-65997

(51) Int. Cl.$^7$ ................................................. B29D 5/00
(52) U.S. Cl. ........................... 29/408; 29/410; 29/33.2; 29/766; 24/403
(58) Field of Search ......................... 24/403, 397, 398, 24/433; 29/408, 410, 33.2, 766, DIG. 13, DIG. 14, DIG. 21, 770

(56) References Cited

U.S. PATENT DOCUMENTS

| 3,333,305 A | | 8/1967 | Taylor |
| 3,368,269 A | * | 2/1968 | Periman ..................... 29/33.2 |
| 3,517,422 A | * | 6/1970 | Uhrig .......................... 24/398 |
| 3,533,140 A | | 10/1970 | Waldes |
| 4,254,539 A | | 3/1981 | Yoshida et al. |
| 4,459,723 A | | 7/1984 | Takano et al. |
| 4,743,412 A | | 5/1988 | Kuse |

* cited by examiner

Primary Examiner—David P. Bryant
Assistant Examiner—Jermie E. Cozart
(74) Attorney, Agent, or Firm—Finnegan, Henderson, Farabow, Garrett, & Dunner, L.L.P.

(57) ABSTRACT

A method for forming ends of a slide fastener chain wherein, coil-shaped fastener elements such as linear fastener elements are attached and sewed to side edge portions of a pair of fastener tapes with sewing yarns as fixing yarns while a core thread is inserted through the fastener elements. The coil-shaped fastener elements are cut off at leg portions, each of which is in contact with the fastener tape, at ends of the fastener elements, so that cut end portions are formed. These cut end portions are pushed inward of the side edge portions, and then, the leg portions and inverted portions thereof are fused to the fastener tapes by heating. As a result, each end of the fastener elements is stabilized, so that the resultant slide fastener is safe.

5 Claims, 19 Drawing Sheets

METHOD FOR FORMING AN END OF SLIDE FASTENER CHAIN

This is a request for filing a Divisional Application under 37 C.F.R. § 1.53(b) of pending prior application Ser. No. 09/550,221 filed Apr. 14, 2000 now U.S. Pat. No. 6,427,295 B1 of Masao MATSUMOTO, Kazuki KUSE, Hideo SHIMAI and Mitsuru YAMAKAWA for SLIDE FASTENER CHAIN METHOD AND APPARATUS FOR FORMING END THEREOF.

BACKGROUND OF THE INVENTION

1. Field of the Invention

The present invention relates to a configuration of an end of linear fastener elements in a space portion of a fastener chain in which coil type or zigzag type linear fastener elements molded of thermoplastic resin monofilament are attached to a fastener tape. It also relates to a method and an apparatus for forming such an end of the linear fastener elements.

2. Description of the Related Art

Conventionally, when a single unit of slide fastener is produced by cutting a continuous slide fastener chain, in which coil-shaped fastener elements made of thermoplastic resin are attached to a fastener tape, at each space portion which is provided at a predetermined interval on the fastener chain, an upper stopper device or a lower stopper device is attached to the coil-shaped fastener elements in a state that an end of the coil-shaped fastener elements is cut to be a cut end portion 7' as shown in FIG. 33.

When the slide fastener in this form is employed on clothes or the like, it may injury the skin of a wearer or catch on his underwear so that an unexpected accident may occur. This point has been improved in a slide fastener as shown in FIG. 34 and disclosed in Japanese Utility Model Publication No. 46-16573. In this slide fastener, linear fastener elements 1" made of thermoplastic resin are sewed onto a side edge portion of a fastener tape 2" with sewing yarns 15", and an upper stopper device 10" is attached to an end of the linear fastener elements 1" such that it is attached over the linear fastener elements 1". Further, the end of the linear fastener elements 1" existing outside the upper stopper device 10" are melted by heating in that state and fused with the fastener tape 2" so as to form a fused portion 8".

In the slide fastener as described above and shown in FIG. 34, the upper stopper device 10" is attached to the linear fastener elements 1" made of thermoplastic resin and then, the linear fastener element 1" existing at a upper end side of the upper stopper device 10" is melted by a heating means and fused to the fastener tape 2" so as to form the fused portion B". Thus, the fused portion 8" is solidified on the fastener tape 2" such that it protrudes from an edge portion of the fastener tape 2". Therefore, there is a problem that because the fused portion 8" is hard, the wearer may feel a physical discomfort and uncomfortable when it touches his skin.

SUMMARY OF THE INVENTION

Accordingly, the present invention has been achieved in views of the above described problems. A main object of the present invention is to provide a slide fastener chain in which a cut end portion of linear fastener elements in the fastener chain is formed in a safety form not having a danger of injuring the skin of a wearer or catching on his underwear, and in which the end of the linear fastener elements is fixed onto a fastener tape of the slide fastener chain in a stabilized state. Therefore, it is possible to finish the slide fastener chain with an upper stopper device or a lower stopper device, or a box pin and a separable pin of a separable stopper device attached in a safety state, so that the slide fastener chain can be used comfortably for a long time while not providing a feeling of a physical discomfort to the wearer.

Another object of the present invention is to provide a slide fastener chain which can be used with safety in a stabilized state when the slide fastener is operated, by specifying the cut end portion position of the linear fastener elements in the fastener chain and a fused form of the linear fastener elements at the cut end portion thereof to be fused to the fastener tape.

Still another object of the present invention is to provide a slide fastener chain in which a space portion can be produced in the fastener chain simply without considering a coiling direction of the coil-shaped fastener elements in the fastener chain or a disposition of an inverted portion of zigzag shaped fastener elements.

Still another object of the present invention is to provide a slide fastener chain allowing the end of the linear fastener elements in the fastener chain to be processed accurately so as to produce a safety form of the fastener chain.

Still another object of the present invention is to provide a slide fastener chain in which the end of the linear fastener elements in the fastener chain is processed in a stabilized state, and then an upper stopper device, a lower stopper device or a box pin and separable pin of a separable stopper device is attached, so that a comfortable use of the slide fastener can be achieved for a long time.

Still another object of the present invention is to provide a method for forming a cut end portion of thermoplastic-resin-made coil type or zigzag type linear fastener elements of a slide fastener chain in a stabilized configuration, which can be attached to the fastener tape securely.

Still another object of the present invention is to provide a method for forming a cut and portion of thermoplastic-resin-made coil type or zigzag type linear fastener elements of a continuous slide fastener chain with ease in a stabilized configuration.

To achieve the above object, according to a first aspect of the present invention, there is provided a slide fastener chain including coil type or zigzag type linear fastener elements of thermoplastic resin attached to a side edge portion of a fastener tape, wherein an end of the linear fastener elements has a fused portion formed by fusing the fastener element at said end to the fastener tape by heating in such a manner that a cut end portion of the end of the linear fastener elements is located inward of the side edge portion, and the cut end portion of the end of the linear fastener elements is located so as not to project from the side edge portion of the fastener tape.

Preferably, according to the first aspect of the present invention, the end of the coil type or zigzag type linear fastener elements has the fused portion formed by fusing the fastener element at said end to the fastener tape by heating in such a manner that the cut end portion of the end of the linear fastener elements is pushed inward of the side edge portion of the fastener tape.

Further, it is preferable that cut end portion of the end of the coil type or zigzag type linear fastener elements is provided by cutting a leg portion of the fastener element at said end which faces and is in contact with the fastener tape, and the fused portion is formed by fusing an inverted portion of the linear fastener element at said end to the fastener tape by heating.

Alternatively, the cut end portion of the end of the coil type or zigzag type linear fastener elements may be provided by cutting a leg portion of the linear fastener element at the end which faces and is in contact with the fastener tape, and the fused portion is formed by fusing the cut leg portion to the fastener tape by heating.

Further alternatively, the cut end portion of the end of the coil type or zigzag type linear fastener elements may be provided by cutting a leg portion of the linear fastener element at the end which faces and is in contact with the fastener tape, and the fused portion is formed by fusing the cut leg portion and an inverted portion to the fastener tape by heating.

Further, it is preferable that the cut end portion of the end of the coil type or zigzag type linear fastener elements is provided by cutting an upper leg portion at the end which is disposed apart from a surface of the fastener tape, and the fused portion is formed by fusing the cut upper leg portion and an inverted portion to the fastener tape by heating.

Furthermore, it is preferable that the cut end portion of the end of the coil type or zigzag type linear fastener elements is located below a core thread or a blade attached at the linear fastener elements and is fused to the fastener tape in a state that the cut end portion is nipped between the core thread or blade and the fastener tape.

Alternatively, it is preferable that the cut end portion of the end of the coil type or zigzag type linear fastener elements is located below a fixing yarn such as a sewing yarn, warp yarn or warp knitting yarn, for fixing the linear fastener elements onto the fastener tape, and the cut end portion is fused to the fastener tape in a state that the cut end portion is nipped between the fixing yarn and the fastener tape.

Further, it is preferable that an upper stopper device or a lower stopper device is attached to the coil-type or zigzag type linear fastener elements at a position adjacent to the fused portion formed on the linear fastener elements.

Alternatively, it is preferable that an upper stopper device, a lower stopper device, or a set of box pin and separable pin of a separable stopper device is attached so as to cover the fused portion formed on the coil type or zigzag type linear fastener elements.

According to a second aspect of the present invention, there is provided a method for forming an end of a slide fastener chain in which coil type or zigzag type linear fastener elements made of thermoplastic resin are attached to a side edge portion of a fastener tape, comprising steps of cutting a leg portion at said end of the linear fastener elements to form a cut end portion; pushing the cut end portion of the linear fastener elements inward of the side edge portion of the fastener tape; and with maintaining that pushed state, fusing the end of the linear fastener elements to the fastener tape by heating.

Further preferably, in forming the end of the slide fastener chain at each space portion of the slide fastener chain where coil type or zigzag type linear fastener elements are attached, the method comprises steps of: forwarding a pair of pushing members into the space portion of the fastener chain; hauling the fastener chain at the space portion so as to locate front and back cut end portions of the space portion at the pushing members and at the same time, pressing the linear fastener elements to be separated in lateral directions thereof while contacting the cut end portions of the linear fastener elements with the pushing members; and pushing each of the cut end portions inward of the side edge portion of the fastener tape.

Furthermore, it is preferable that the method for forming the end of the slide fastener chain comprises a step of, with the cut end portion of said end of the coil type or zigzag type linear fastener elements being pushed inward of the side edge portion of the fastener tape, fusing an inverted portion of the fastener element at said end to the fastener tape by heating.

Still further, it is preferable the method for forming the end of the slide fastener chain comprises steps of: pressing the side edge portions of a pair of left and right fastener tapes in lateral directions thereof by each of the pushing member when the pushing members ascend to contact with the side edge portions; and bending the side edge portions of the fastener tapes in a predetermined direction, for example, downward to enlarge a gap between the pair of left and right fastener tapes and at the same time, pushing forcibly the cut end portions of the coil type or zigzag type linear fastener elements inward of the side edge portions of the fastener tapes.

Alternatively, it is preferable that the method for forming the end of the slide fastener chain comprises steps of: pressing the cut end portions formed at the ends of the coil type or zigzag type linear fastener elements attached to the side edge portions of a pair of fastener tapes in lateral directions thereof by each of the pushing members when the pushing members descend to contact with the cut end portions to separate only the cut end portions of the linear fastener elements in lateral directions thereof and forcibly pushing them inward of the side edge portions of the fastener tapes.

According to a third aspect of the present invention, there is provided an apparatus for forming an end of a slide fastener chain, comprising: a transfer path formed on a top face of a die for transferring a continuous slide fastener chain having space portions to an end-forming mechanism and discharging the slide fastener chain after the ends are formed, a gap portion provided in a middle portion of the end-forming mechanism at the transfer path, an arm movable in and out of the gap portion for pushing down the continuous slide fastener chain being transferred above the gap portion, a pair of pushing members disposed in front and back of the gap portion and projectable toward the transfer path for pushing cut end portions of linear fastener elements projecting from side edge portion of a pair of fastener tapes inwardly, a ultrasonic horn disposed so as to face parts of the die corresponding to the pushing members and movable toward and away from the die, so that the cut end portions of the linear fastener elements at the space portion at the end of the continuous slide fastener chain are fused to and formed on the fastener tapes in such a manner that the cut end portions of the ends of the linear fastener elements does not project from the side edge portions of the fastener tapes.

Further, it is preferable that the pushing member disposed in each of front and back of the gap portion has a taper surface at an end surface thereof to contact with linear fastener elements so that the cut end portions of the linear fastener elements are smoothly pushed inward of the side edge portions of the fastener tapes.

Furthermore, it is preferable that the die is provided with a guide groove through which the pushing member is slidably movable up and down in such a manner that the pushing member can come in and out of an upper surface of the guide groove.

Still further, it is preferable that the ultrasonic horn disposed above the die is provided with an insertion groove in which the pushing member can be inserted.

Still further, it is preferable that the die is provided with a recessed portion on each of opposite sides of an end portion of the guide groove so that the side edge portion of the fastener tape can be bent and accommodated in the recessed portion.

Still further, it is preferable that the ultrasonic horn is provided with a cut-out portion on each of opposite sides of an end portion of the insertion groove so that a core thread, fixing yarn or blade can be accommodated and pressed in the cut-out portion.

It is also preferable that the ultrasonic horn disposed above the die is provided with a guide groove through which the pushing member is slidably movable up and down so as to come in and out of a lower surface of the guide groove.

DESCRIPTION OF THE EMBODIMENTS

Hereinafter, embodiments of a slide fastener chain, a method for forming an end of the slide fastener chain and an apparatus for forming an end of the slide fastener chain according to the present invention will be described in detail with reference to the accompanying drawings.

Figure 29:
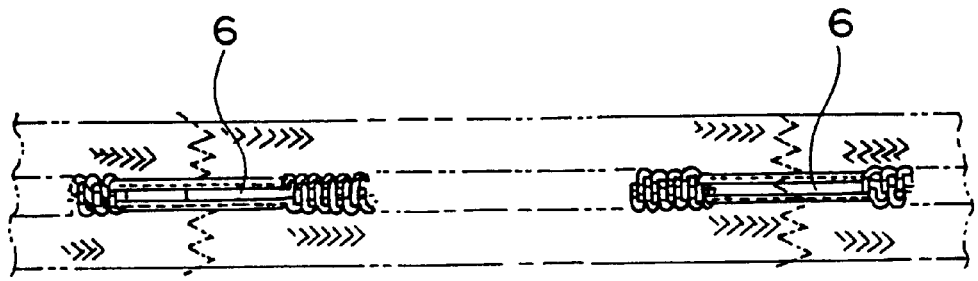
FIG. 29 is a plan view showing a state in which space portions are disposed on a continuous fastener chain at a predetermined interval.

As shown in FIGS. 1 to 4, according to a slide fastener chain of the present invention, coil-shaped fastener elements 11, which are formed by coiling monofilament of synthetic resin such as polyamide and polyester, is used for linear fastener elements 1. A core thread 3 formed of twisted yarn of multi-filament of synthetic resin such as polyamide and polyester is inserted into each row of the coil-shaped fastener elements 11. Then, the coil-shaped fastener elements 11 are sewed onto a surface of a side edge portion 5 of a fastener tape 2 formed of synthetic resin woven cloth 13 by multi-thread chain stitches using sewing yarns 15 of synthetic resin as fixing yarns 4, so that a continuous fastener chain is formed. Then, space portions 6 are produced at a predetermined interval in the continuous fastener chain by, for example, punching out the coil-shaped fastener elements 11 as shown in FIG. 29. Then, the slide fastener chain is cut at each space portion 6 so as to produce a single slide fastener.

Figure 1:
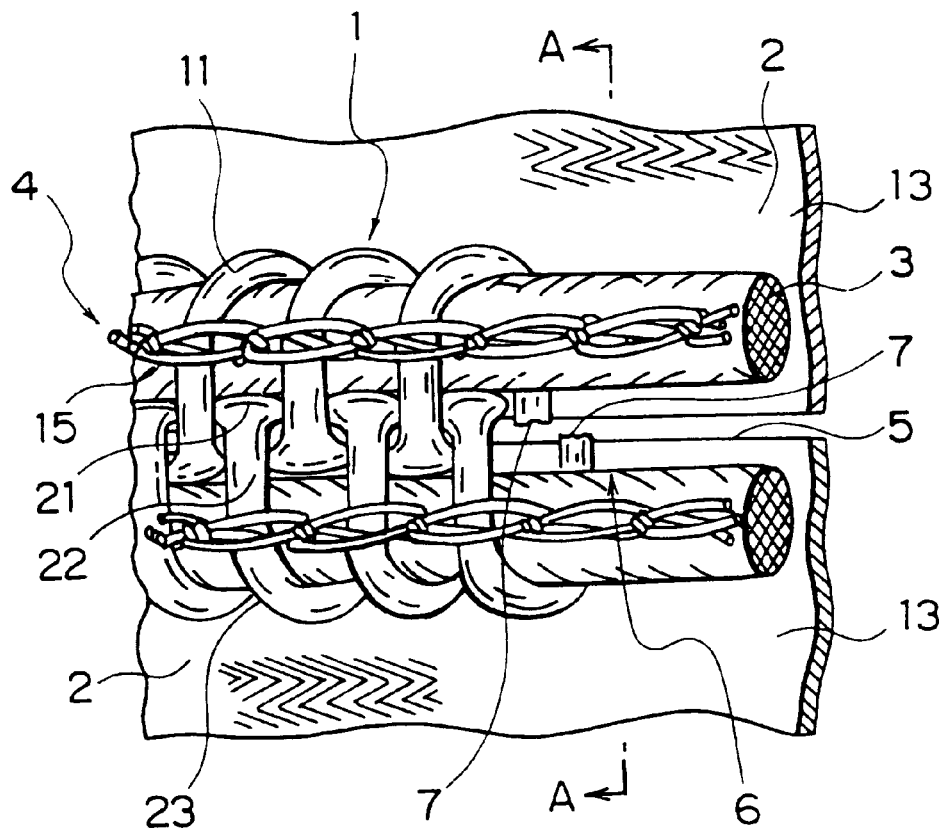
FIG. 1 is a partial plan view of a fastener chain according to a first embodiment of the invention showing a state in which a cut end portion of a linear fastener element protrudes from a side edge portion.
Figure 2:
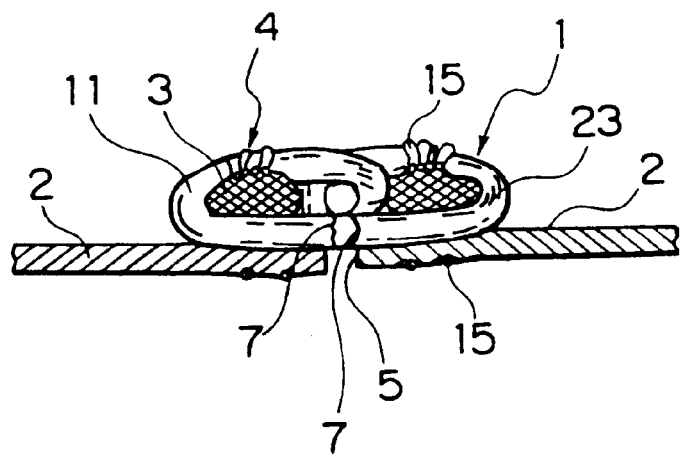
FIG. 2 is a sectional view taken along the line A—A of the same fastener chain.

In the space portion 6 to be formed in the fastener chain, as shown in FIG. 1, the coil-shaped fastener elements 11 are cut at leg portions 22 so that a predetermined length of the coil-shaped fastener elements 11 each comprising an engaging head portion 21, a leg portion 22 and an inverted portion 23 is removed. After that part of the coil-shaped fastener elements 11 is removed, sharp cut end portions 7 of the leg portions 22 of the coil-shaped fastener elements 11 protrude from the side edge portions 5. When a single slide fastener is finished in this state, the cut end portion 7 may touch and damage the skin of a wearer or may catch on a underwear, thereby causing an inconvenience.

Figure 3:
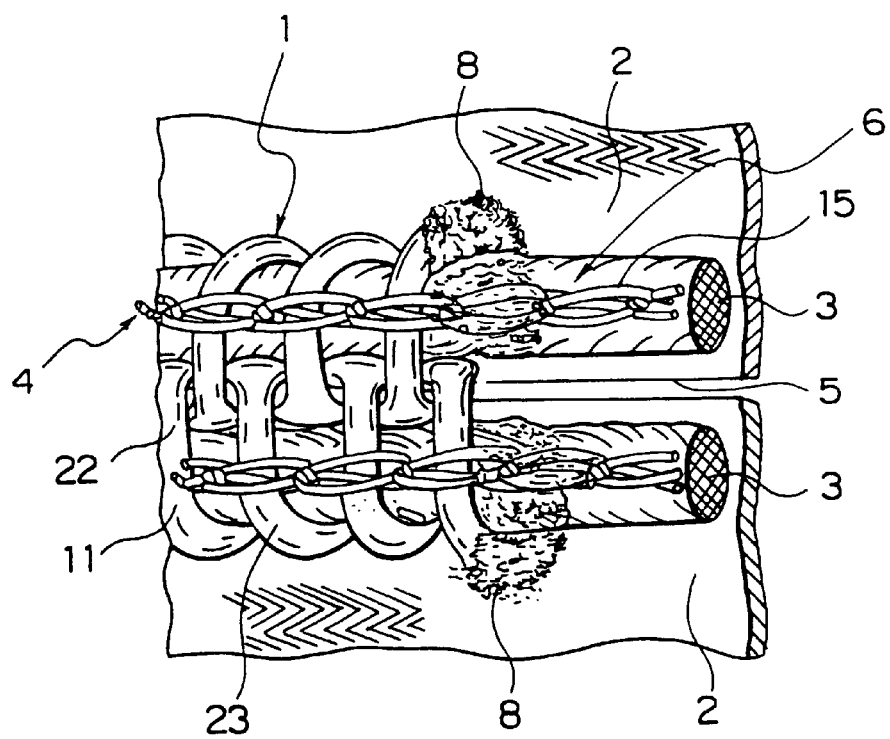
FIG. 3 is a partial plan view showing a fused portion formed at an end of the same fastener chain.

Therefore, according to the present invention, the cut end portions 7 of the coil-shaped fastener elements 11 at the space portions of the slide fastener chain are fixed in such manner that they are located inward of the side edge portions 5 of a pair of the fastener tapes 2. Then, each fastener tape 2 and the coil-shaped fastener elements 11 are fixed to each other such that the cut end portion 7 does not protrude from the side edge portion 5 of the fastener tape 2. As shown in FIG. 3, with the cut end portion 7 of the coil-shaped fastener elements 11 held inward of the side edge portion 5 of the fastener tape 2, the leg portion 22 and inverted portion 23 at the end of the coil-shaped fastener elements 11 are heated and pressurized onto the fastener tape 2 together with the gore thread 3 and, for example, fused by crushing with pressure by means of ultrasonic processing or high frequency processing, or fused by a laser beam or a heating body incorporating electric heater, so that a fused portion 8 is formed. Consequently, the coil-shaped fastener elements 1 are fixed, thus the slide fastener is finished.

According to this embodiment, the cut end portion 7 exists in the leg portion 22 which is at a lower portion of the coil-shaped fastener element 11 so that the lower leg portion 22 faces to contact with the fastener tape 2. Therefore, the fused portion 8 formed with the leg portion 22 and inverted portion 23 comes into firm contact with the fastener tape 2 so that the fastener tape 2 is integrated with the fused portion 8.

Figure 5:
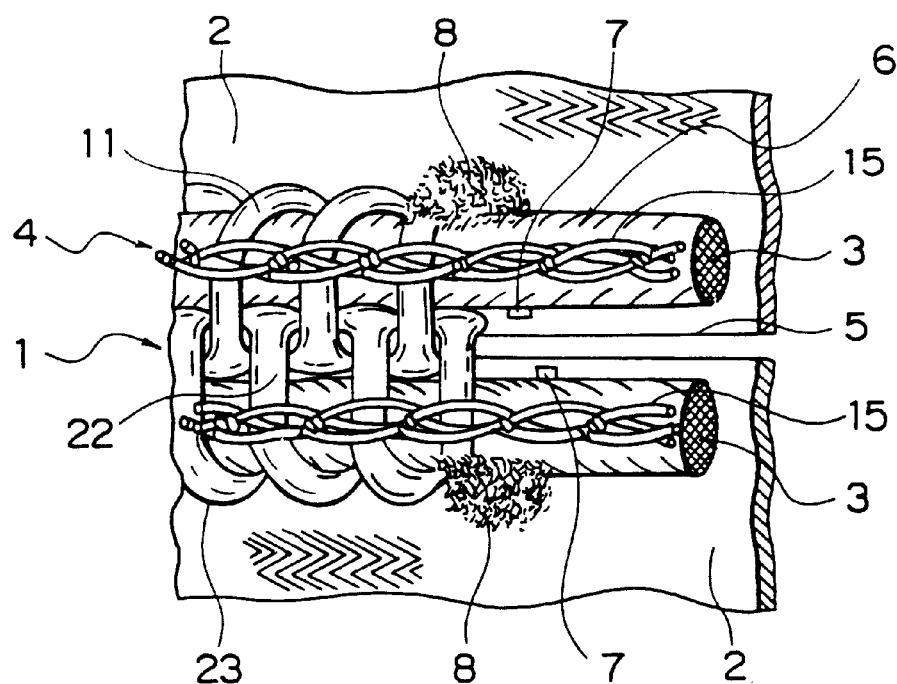
FIG. 5 is a partial plan view showing a fused portion formed at the end according to a modification of the same fastener chain.

FIG. 5 shows a fastener chain of a similar configuration to the above described embodiment. In this fastener chain, while a cut end portion 7 of the coil-shaped fastener elements 11 is located inward of the side edge portion 5 of the fastener tape 2, only an inverted portion 23 at the end of the coil-shaped fastener elements 11 is fused onto the fastener tape 2 by heating to fix the coil-shaped fastener elements 11. As a result, the slide fastener is completed.

Figure 6:
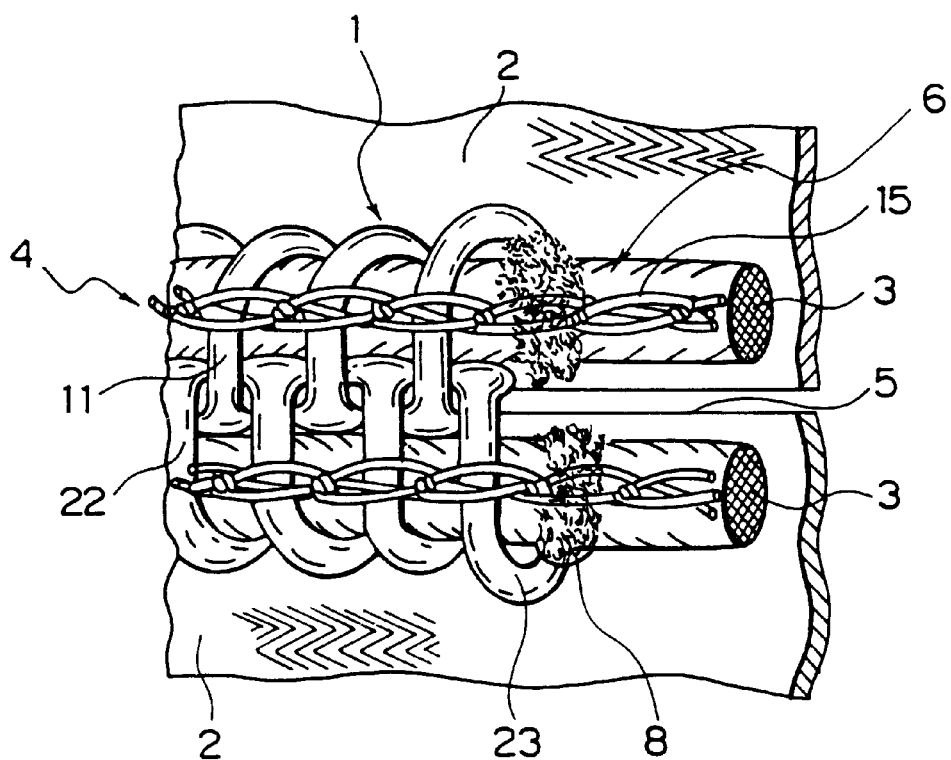
FIG. 6 is a partial plan view showing a fused portion formed at the end indicating another modification of the same fastener chain.

FIG. 6 also shows a fastener chain of a similar configuration to the above embodiment. In this fastener chain, while a cut end portion 7 of the coil-shaped fastener elements 11 is located inward of the side edge portion 5 of the fastener tape 2, only a leg portion 22 adjacent the cut end portion 7 of the coil-shaped fastener elements 11 is fused together with the core thread 3 onto the fastener tape 2 so as to form a fused portion 8. As a result, the coil-shaped fastener elements 11 are fixed, thus the slide fastener is finished.

Figure 7:
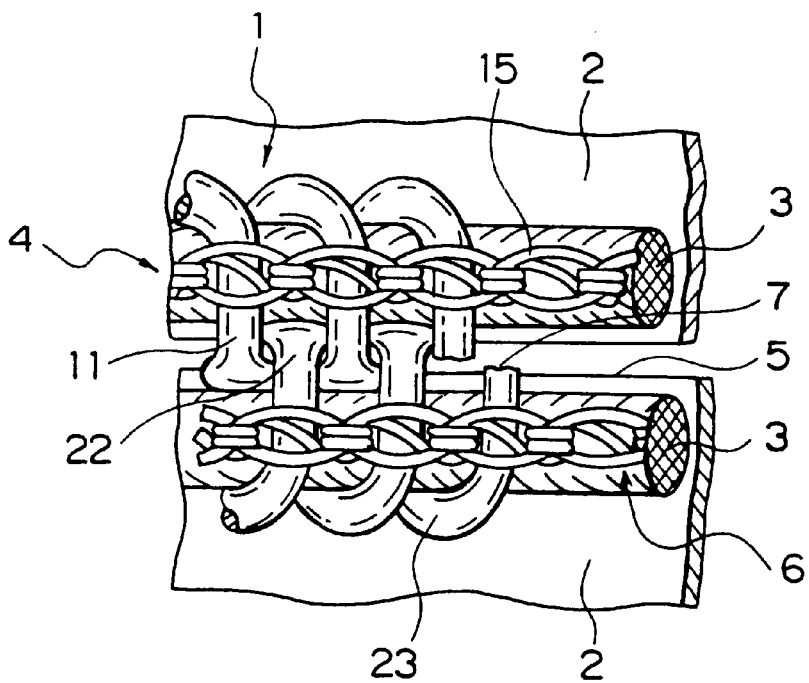
FIG. 7 is a partial plan view of a fastener chain according to a second embodiment of the invention showing a state in which a cut end portion of linear fastener elements protrude from a side edge portion.
Figure 8:
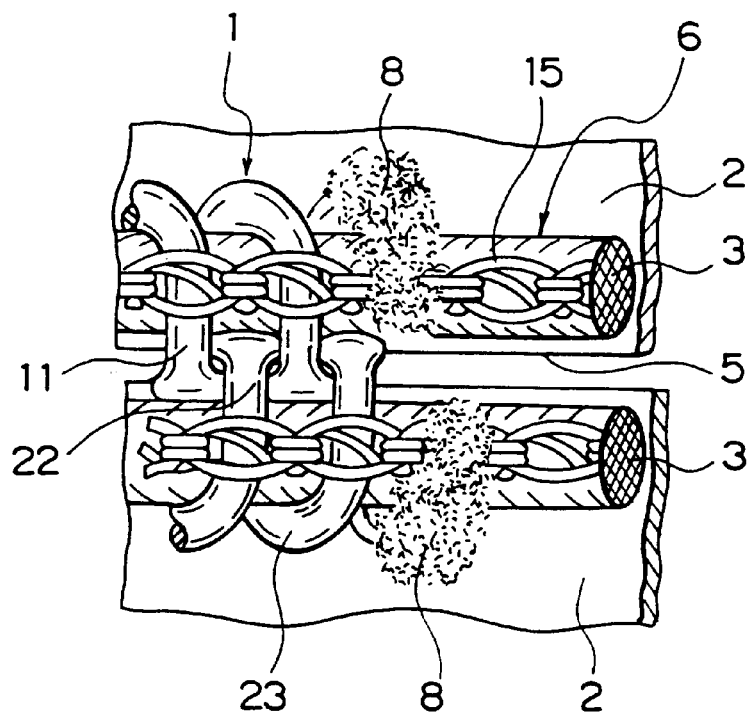
FIG. 8 is a partial plan view showing a fused portion formed at the end of the fastener chain.

In a coil-shaped fastener chain shown in FIGS. 7 and 8, a coiling direction of the coil-shaped fastener chain 11 is inverse to that of the above described embodiment. A cut end portion 7 in a space portion 6 provided in the coil-shaped fastener chain exists in an upper leg portion 22 which is disposed apart from the fastener tape 2, so that the cut end portion 7 appears on the surface of the fastener chain. Therefore, for forming a fused portion 8, the leg portion 22 appearing on the surface is kept inward of a side edge portion 5 of the fastener tape 2 and then, the leg portion 22 and an inverted portion 23 are fused to the fastener tape 2 and the core thread 3 by heating so as to form the fused portion 8. As a result, the coil-shaped fastener elements 11 are fixed, thus the slide fastener is finished.

Figure 9:
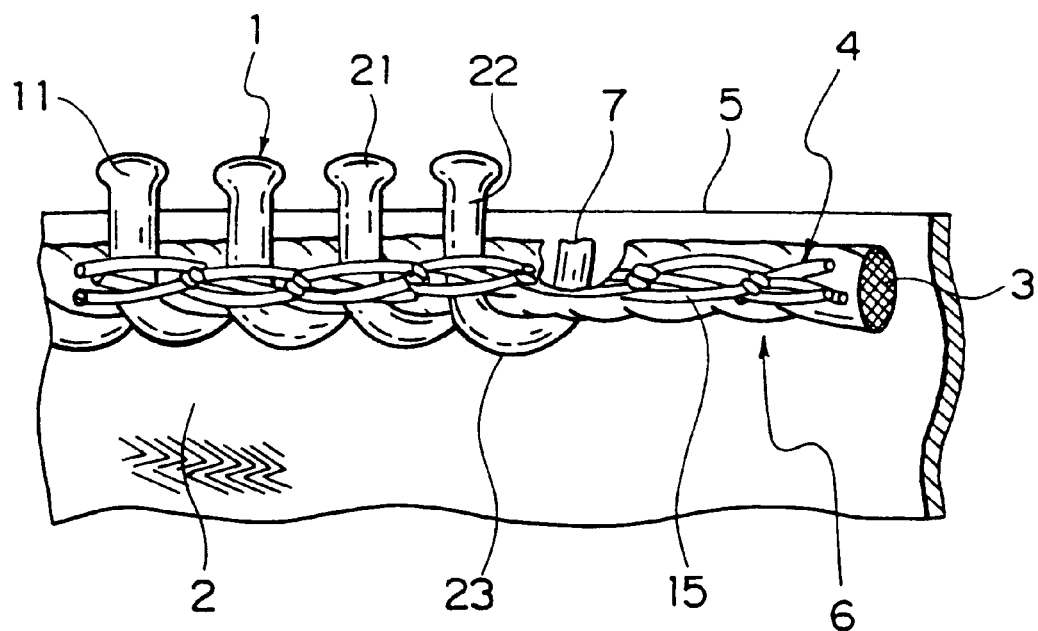
FIG. 9 is a partial plan view of a fastener stringer according to a third embodiment of the invention showing a state in which a cut end portion of linear fastener elements exists inside the side edge portion.
Figure 10:
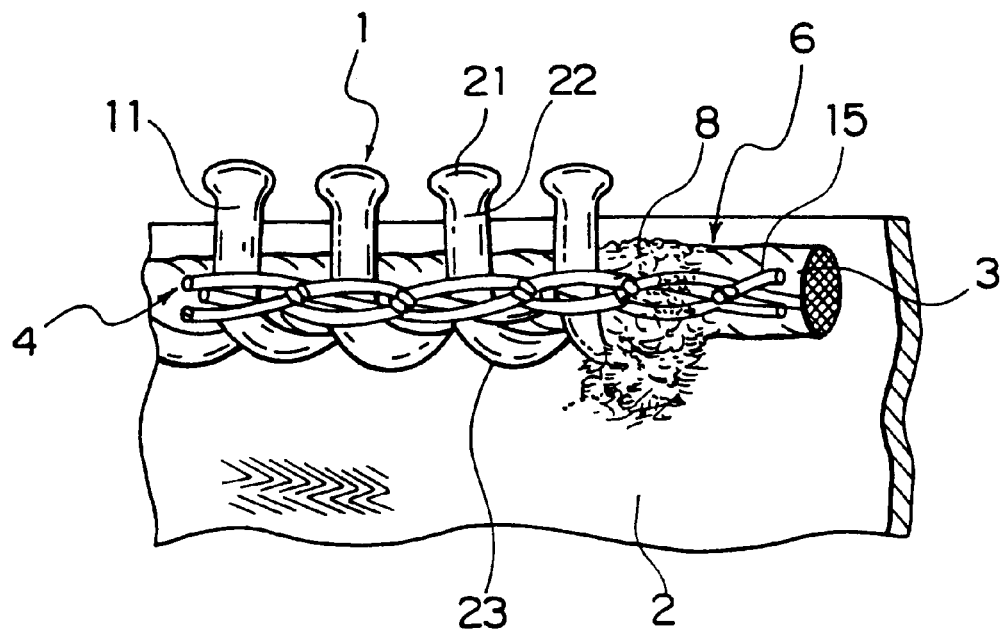
FIG. 10 is a partial plan view showing the fused portion formed at the end of the fastener stringer.

In a fastener stringer shown in FIGS. 9 and 10, a cut end portion 7 provided in a leg portion 22 of the coil-shaped fastener elements 11 is already disposed inward of a side edge portion 5 of a fastener tape 2 and is hidden below a core thread 3 when the space portion 6 is produced. Thus, with this state, the leg portion 22 and an inverted portion 23 at the end of the coil-shaped fastener elements 11 are heated to press and fuse the fastener tape 2 and the core thread 3 so as to form a fused portion 8. As a result, the coil-shaped fastener elements 11 are fixed, thus the slide fastener is finished.

Figure 11:
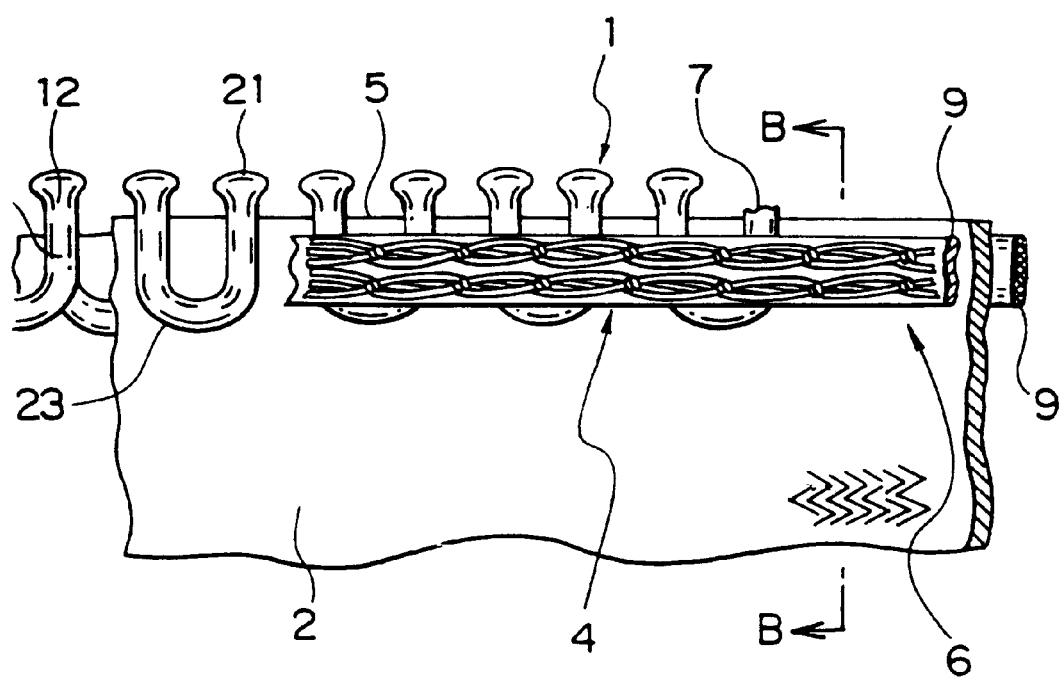
FIG. 11 is a partial plan view of a fastener stringer according to a fourth embodiment of the invention showing a state in which a cut end portion of linear fastener elements protrudes from the side edge portion.
Figure 12:
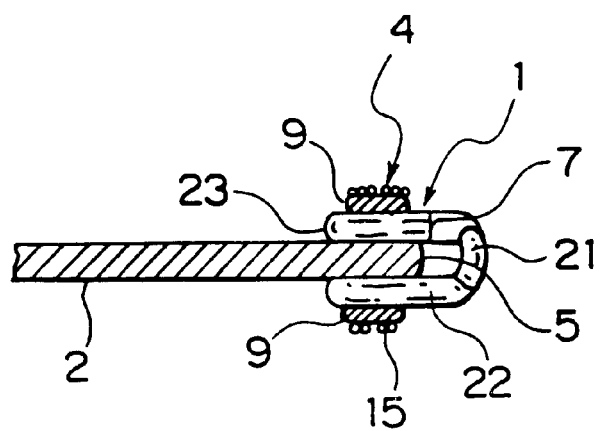
FIG. 12 is a sectional view taken along the line B—B of the fastener stringer.
Figure 13:
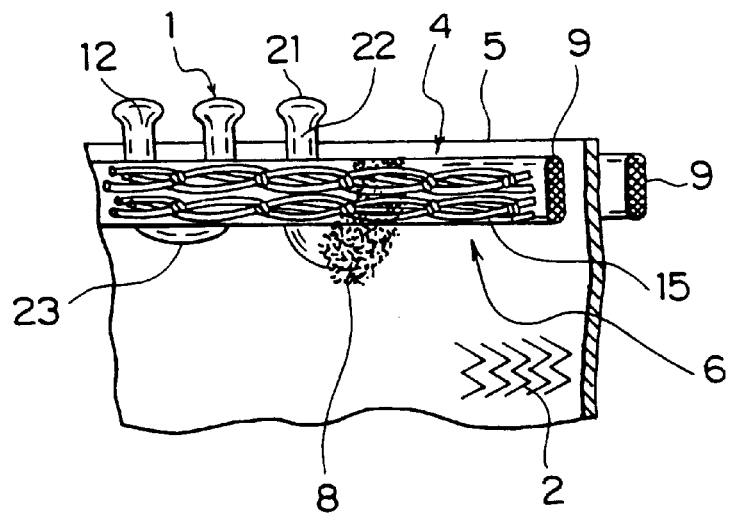
FIG. 13 is a partial plan view showing the fused portion formed at the end of the fastener stringer.

In a fastener stringer shown in FIGS. 11 to 13, zigzag shaped fastener elements 12, which are made by bending monofilament of synthetic resin in a zigzag pattern so as to have each element bent at its center portion, are used for linear fastener elements 1. The zigzag shaped fastener elements 12 are held on the side edge portion 5 of the fastener tape 2 by nipping and a blade 9 is attached to an outside face of the zigzag shaped fastener elements 12. Then, the zigzag shaped fastener elements 12 are sewed and fixed onto the fastener tape 2 using sewing yarns 15 of multi-thread chain stitches fox fixing yarns 4.

In this fastener stringer, a cut end portion 7 provided in a leg portion 22 of the zigzag shaped fastener elements 12 protrudes from the side edge portion 5 of the fastener tape 2. Therefore, the cut end portion 7 is pushed inward of the side edge portion 5 and then, the leg portion 22 and an inverted portion 23 are fused, together with the blade, onto the fastener tape 2 by heating to form a fused portion 8. As a result, the zigzag shaped fastener elements 12 are fixed, thus the slide fastener is finished.

The blade 9 may be placed on an outer face of the zigzag shaped fastener elements 12 and sewed with the sewing yarn 15, with the zigzag shaped fastener elements 12 being placed on a top face, i.e., a surface of the side edge portion 5 of the fastener tape 2. Alternatively, the zigzag shaped fastener elements 12 may be sewed directly to the fastener tape 2 without use of the blade 9.

Figure 14:
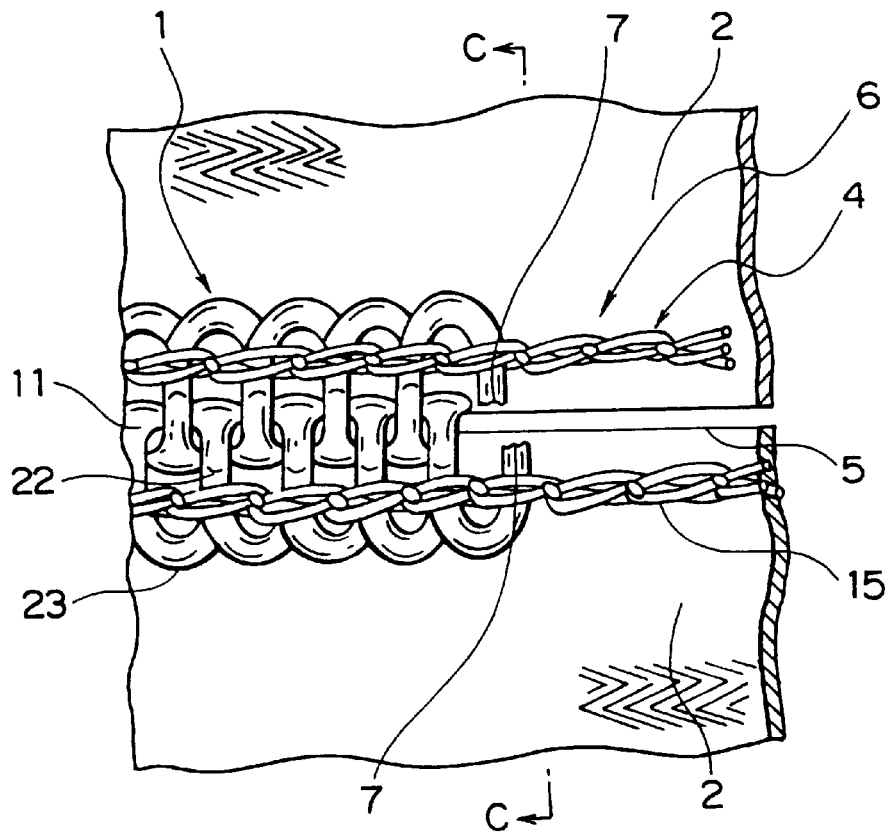
FIG. 14 is a partial plan view of a fastener chain according to a fifth embodiment of the invention showing a state in which the cut end portion of a linear fastener element exists inward of a side edge portion.
Figure 15:
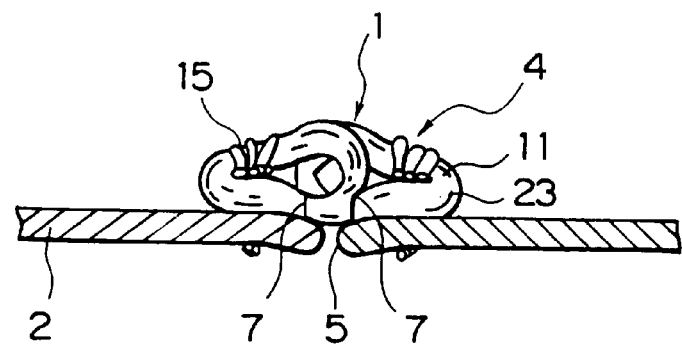
FIG. 15 is a sectional view taken along the line C—C of the fastener chain.
Figure 16:
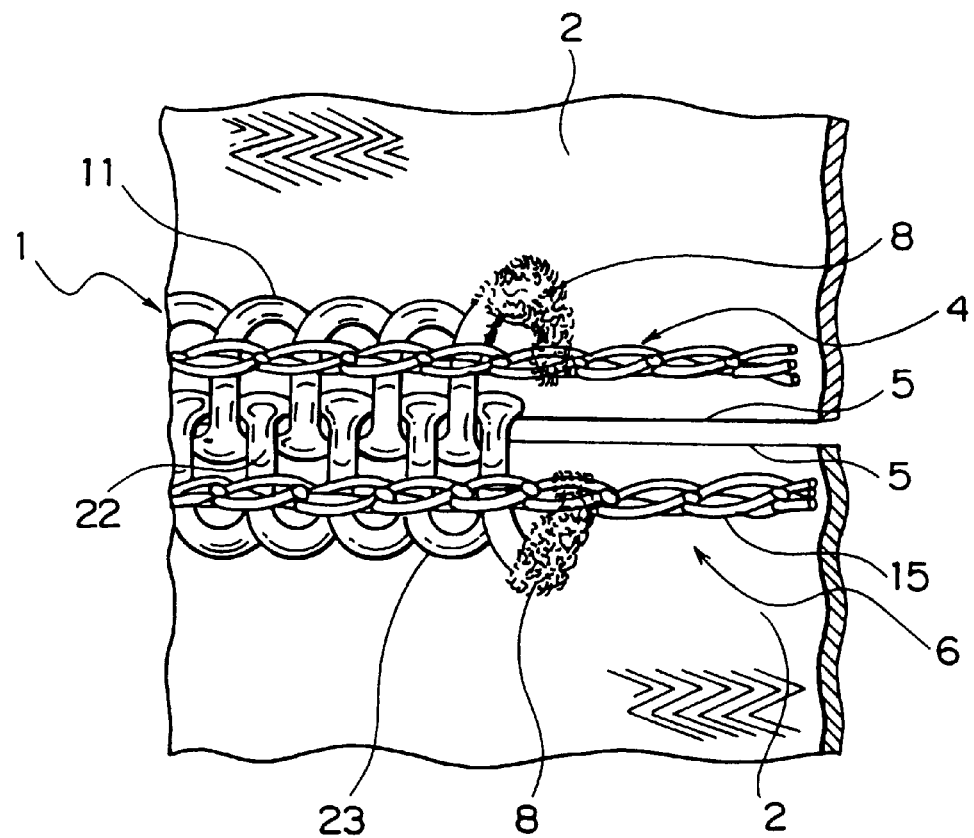
FIG. 16 is a partial plan view showing a fused portion formed at the end of the fastener chain.

In a fastener chain shown in FIGS. 14 to 16, coil-shaped fastener elements 11 are sewed onto a side edge portion 5 of a fastener tape 2 without a core thread 3 using sewing yarns 15 of multi-thread chain stitches. In this fastener chain also, a cut and portion 7 provided in a leg portion 22 of the coil-shaped fastener elements 11 is pushed inward of the side edge portion 5 of the fastener tape 2, and the leg portion 22 and an inverted portion 23 are fused onto the fastener tape 2 by heating so as to form a fused portion 8. As a result, the coil-shaped fastener elements 11 are fixed, thus the slide fastener is finished.

Figure 17:
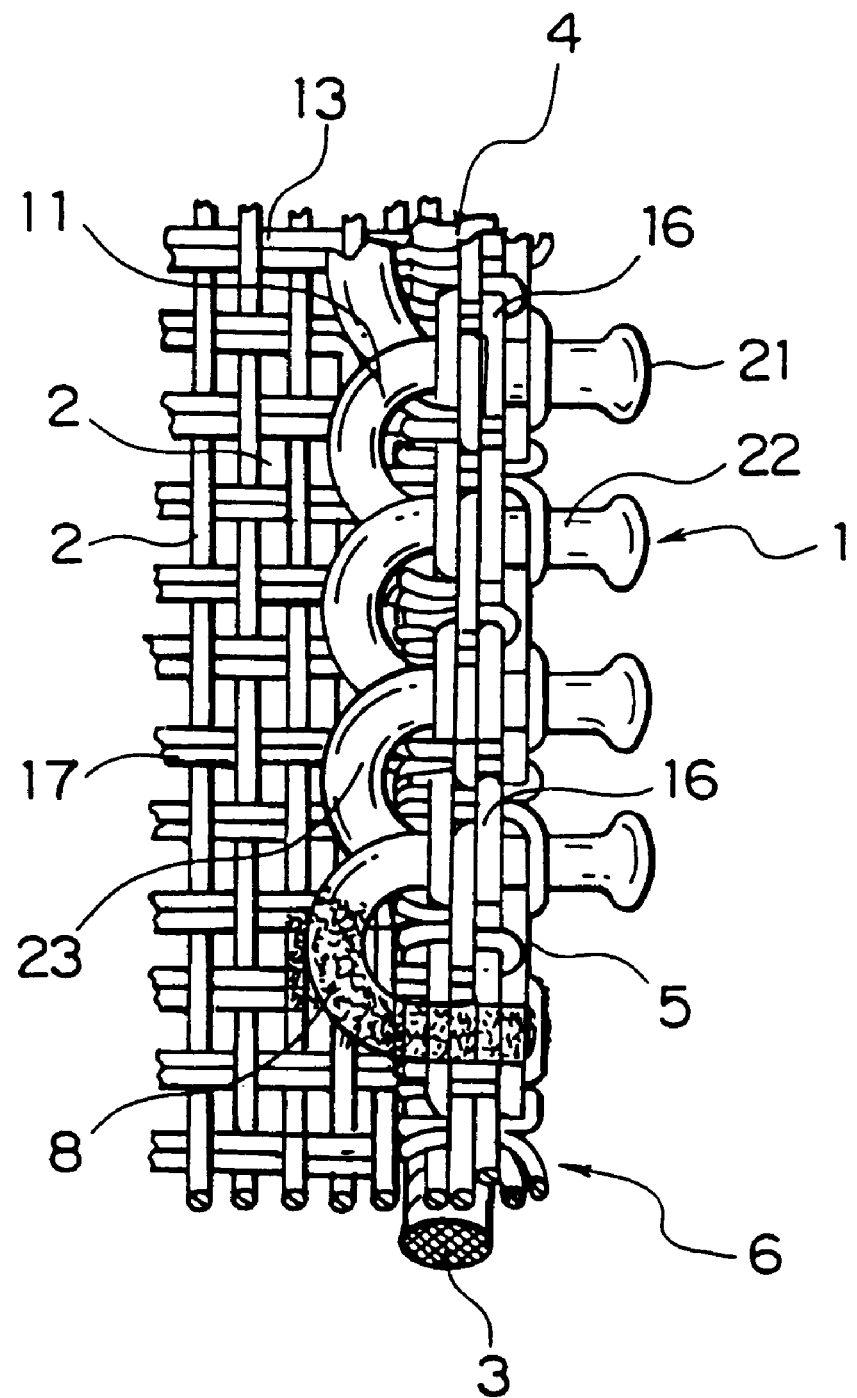
FIG. 17 is a partial plan view showing a fused portion formed at an end of the linear fastener element according to a sixth embodiment of the invention.

In a fastener stringer shown in FIG. 17, the coil-shaped fastener elements 11 are woven onto a side edge portion 5 of a woven cloth 13 wove in double picks by a needle loom. Because the coil-shaped fastener elements 11 are fixed to the side edge portion 5 of the fastener tape 2 by mingling of warp yarn 16 and weft yarn 17 of double picks for fixing yarns 4, the cut end portion 7 provided in the leg portion 22 of the coil-shaped fastener elements 11 protrudes from the side edge portion 5. Thus, with this cut end portion 7 being pushed inward of the side edge portion 5, the leg portion 22 and an inverted portion 23 at the end of the coil-shaped fastener elements 11 are fused onto the fastener tape 2 by heating so as to form a fused portion 8. As a result, the coil-shaped fastener elements 11 are fixed, thus the slide fastener is finished.

Figure 18:
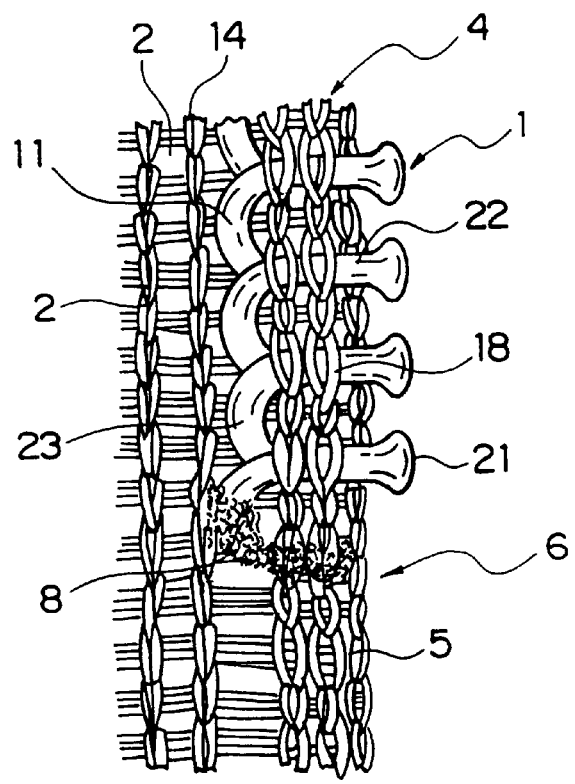
FIG. 18 is a partial plan view showing a fused portion formed at an end of linear fastener elements according to a seventh embodiment of the invention.

In a fastener stringer shown in FIG. 18, coil-shaped fastener elements 11 are woven onto a side edge portion 5 of a knitted ground 14 knitted with warp knitting yarns 18. Because the coil-shaped fastener elements 11 are fixed onto the side edge portion 5 of the fastener tape 2 of the knitted ground 14 by the warp knitting yarns 18 for fixing yarns 4, a cut end portion 7 provided in a leg portion 22 of the coil-shaped fastener elements 11 protrudes from the side edge portion 5. Thus, the cut end portion 7 is pushed inward of the side edge portion 5 and then, the leg portion 22 and an inverted portion 23 at the end of the coil-shaped fastener elements 11 are fused onto the fastener tape 2 by heating to form a fused portion 8. As a result, the coil-shaped fastener elements 11 are fixed, thus the slide fastener is finished.

Figure 19:
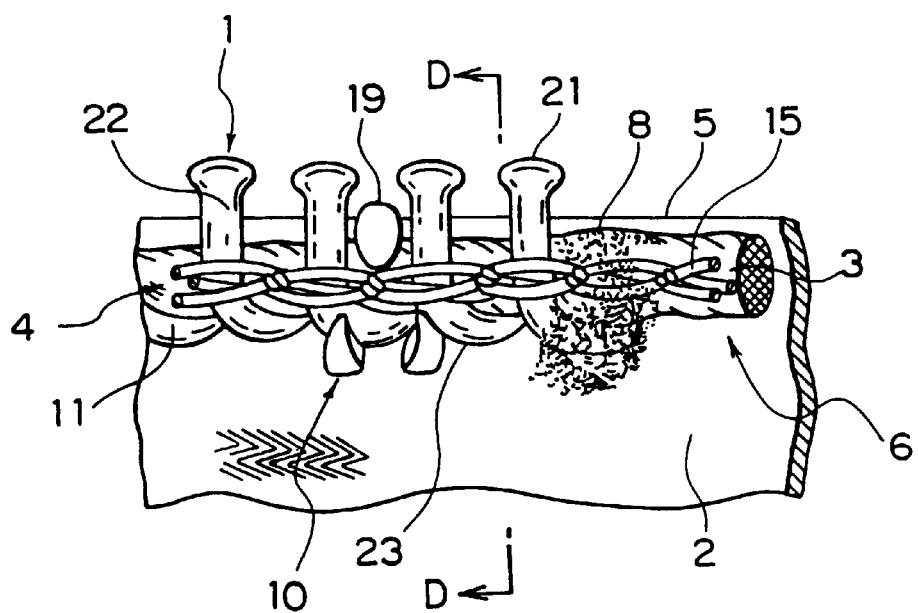
FIG. 19 is a partial plan view of a fastener stringer in which an upper stopper device is attached in the vicinity of a fused portion formed at an end of linear fastener elements according to the invention.
Figure 20:
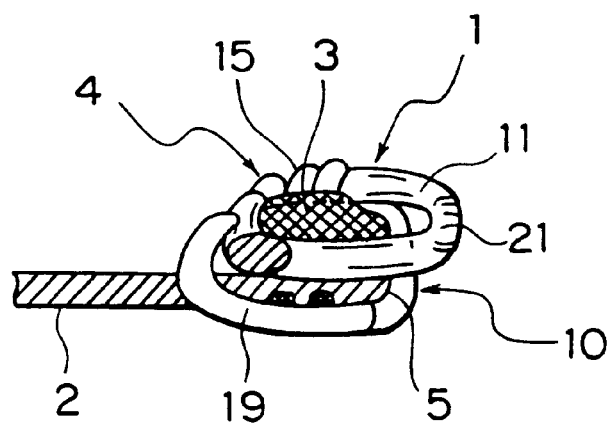
FIG. 20 is a sectional view taken along the line D—D of the fastener stringer.

A fastener stringer shown in FIGS. 19 and 20 has an upper stopper device 10 attached to linear fastener elements 1 at a position near a fused portion 8 formed on an end of the linear fastener elements 1 in the fastener chain or fastener stringer as described in the respective embodiments. The fused portion 8 is formed at the end of the coil-shaped fastener elements 11 sewed onto the fastener tape 2 as shown here, and a three-leg stopper device 19 of metal is pierced through a portion the coil-shaped fastener element 11 near this fused portion 8. Then, the legs are bent at their ends to fix the device 19 so that the upper stopper is formed.

Figure 21:
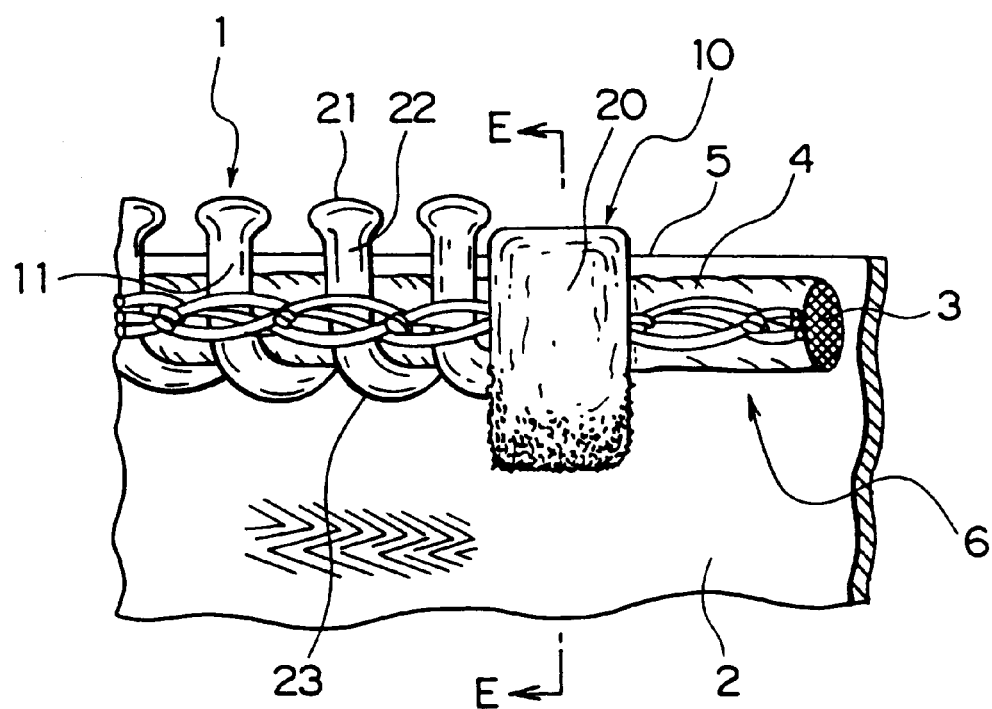
FIG. 21 is a partial plan view of a fastener stringer in which an upper stopper device is attached so as to cover a fused portion formed at an end of linear fastener elements according to the invention.
Figure 22:
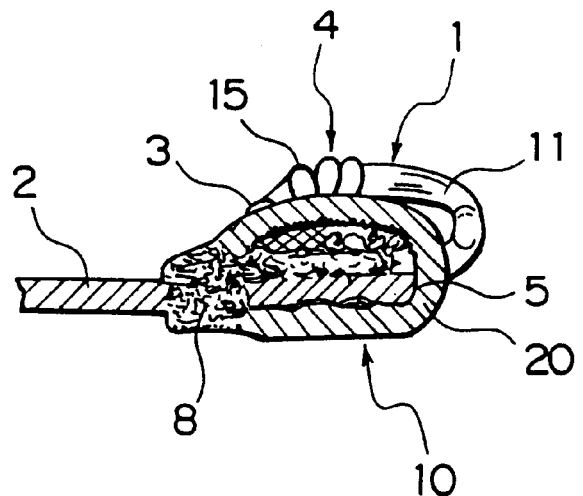
FIG. 22 is a sectional view taken along the line E—E of the fastener stringer.

In a fastener stringer shown in FIGS. 21 and 22, an upper stopper device 10 is attached so as to cover a fused portion 8 formed at an end of the linear fastener elements 1 of the fastener chain or fastener stringer as described in the above described respective embodiments. As shown in the Figures, a fused portion 8 is formed at the end of the coil-shaped fastener elements 11 sewed onto the fastener tape 2 and then, a synthetic resin U-shaped stopper device 20 as an upper stopper device 10 is attached from the side edge portion 5 so as to wrap the fused portion 8 and pressed by heating. Particularly by crushing a front tip of the U-shaped stopper device 20, it is fused onto the fastener tape 2. Alternatively, a metallic U-shaped stopper device may replace the U-shaped stopper device 20 made of synthetic resin.

The foregoing description is directed to a slide fastener chain in which the upper stopper device 10 is attached or molded to the slide fastener chain at a position adjacent to or so as to cover the fused portion 8 formed at the end of the coil-type or zigzag-type linear fastener elements of thermoplastic resin in a slide fastener chain or slide fastener stringer. The slide fastener chain may be finished with a lower stopper device attached or molded at a position adjacent the fused portion 8 formed in the slide fastener chain, or fused or molded so as to cover the fused portion 8. Further, the slide fastener chain may be finished with a separable stopper device in which a box pin and separable pin of the separable stopper device are attached or molded to the side edge portions 5 of the fastener tapes 2 so as to cover the fused portions of the slide fastener chain.

Next, a method for forming the end of the slide fastener chain of the present invention will be described. In an embodiment shown in FIG. 23, a core thread 3 is inserted into the coil-shaped fastener elements 11. These coil-shaped fastener elements 11 are sewed onto a surface of a side edge portion 5 of a fastener tape 2 with the sewing yarns 15 of multi-thread chain stitches. Then, these coil-shaped fastener elements 11 are cut at a predetermined interval to form space portions 6, whereby a cut end portion 7 is formed in a leg portion 22 of each fastener element 11 in the vicinity of each space portion 6.

Figure 24:
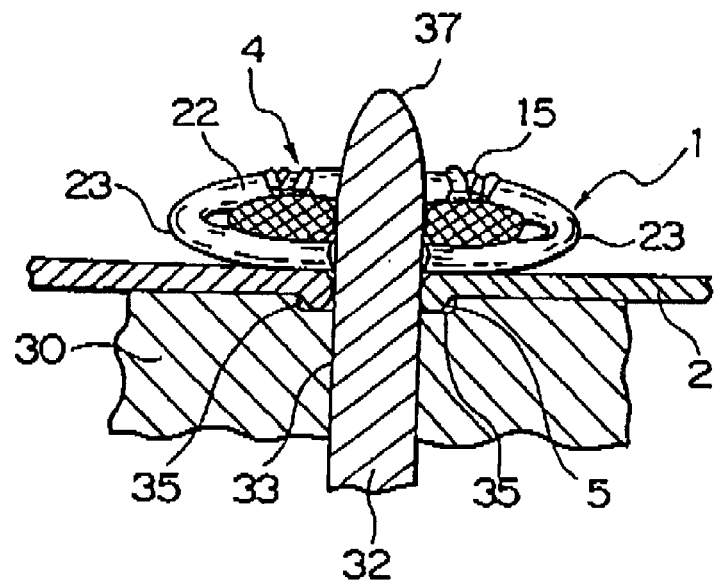
FIG. 24 is a sectional view of the processing step of the fastener chain.
Figure 25:
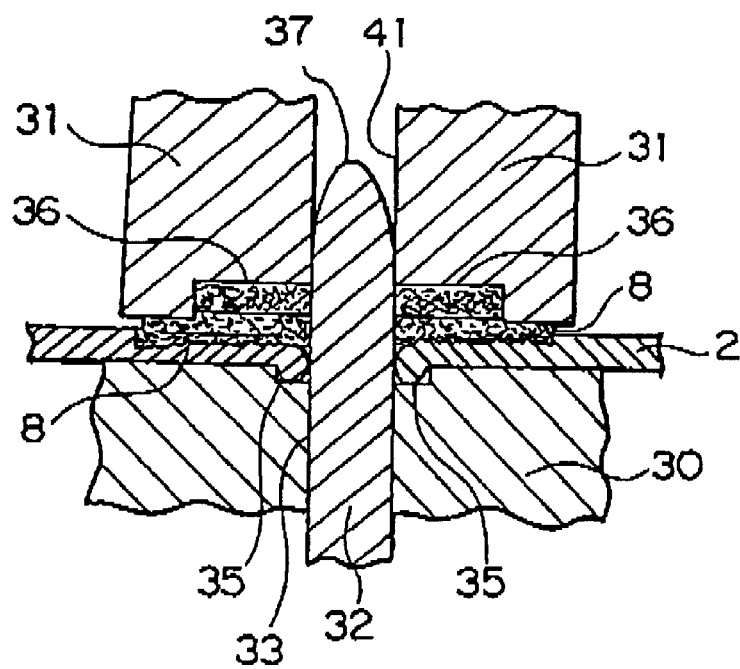
FIG. 25 is a sectional view showing a step of heating and pressing the fastener chain.

The continuous fastener chain in this state is sent to a process of heating the coil-shaped fastener element 11 near the space portion 6 so as to form a fused portion 8. For example, as shown in FIGS. 24 and 25, the continuous fastener chain is sent to a die 30 having in its center a guide groove 33 through which a pushing member 32 can slide up and down, and a recessed portion 35 provided on each of both sides of the guide groove 33 for accommodating a bent side edge portion 5 of the fastener tape 2 when the pushing member 32 ascends. Then, the pushing member 32 having a taper surface 37 at its end surface and a thickness equal to an interval between the opposite core threads 3 of the fastener chain is inserted in and through the guide groove 33 of the die 30. The pushing member 32 is movable in the space portion 6. When the pushing member 32 ascends to contact with the side edge portion 5, the taper surface 37 comes into contact with the cut end portion 7 of the coil-shaped fastener element 11 protruding from each side edge portion 5 of each fastener tape 2 during a transportation of the fastener chain. As a result, as the fastener chain is moved, the taper surface 37 guides and pushes the cut end portion 7 inward of the fastener tape 2 and at the same time, the inverted portion 23 of the coil-shaped fastener element 11 is pushed outward of the core thread 3.

Alternatively, the pushing member 32 may push the cut end portion 7 of the coil-shaped fastener element 11 inward of the fastener tape 2 as it ascends to a stopped fastener chain.

In this state, a ultrasonic horn 31 for descending to an upper surface of the cut end portion 7 formed at the end of the coil-shaped fastener elements 11 is disposed on both sides of the pushing member 32. The ultrasonic horn 31 is of the same size as a single fastener element 11. Further, the ultrasonic horn 31 has an insertion groove 41 at its center in which the pushing member 32 can be inserted, and a cut-out portion 36 disposed on each of opposite sides of the insertion groove 41 at a position facing the pushing member 32 for receiving and compressing the core thread 3. When the ultrasonic horn 31 descends to press the fastener element 11 against the die 30 from above, the fastener element 11, core thread 3 and sewing yarn 15 are compressed and heated, so that the leg portion 22 and inverted portion 23 of the fastener element 11 are fused onto the fastener tape 2, as shown in FIG. 25.

Figure 4:
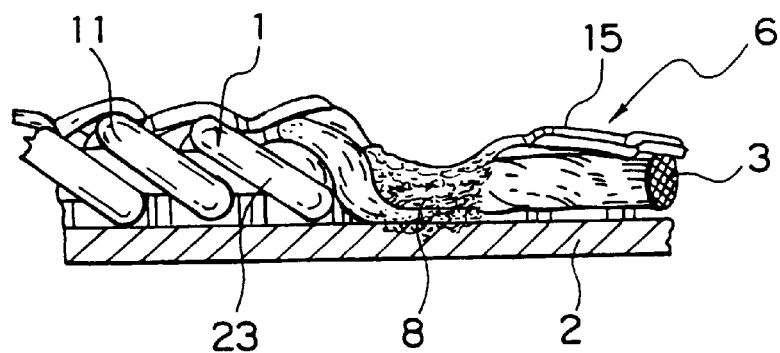
FIG. 4 is a side view of the end of the same fastener chain.

Compression and heating of the core thread 3 and sewing yarn 15 are to be carried out with an adjustment to such a degree that the core thread 3 and sewing yarns 15 are not cut. In a resultant product of the slide fastener chain, the fused portion 8 is formed at an end of the coil-shaped fastener element 11, as shown in FIGS. 3 and 4.

Figure 26:
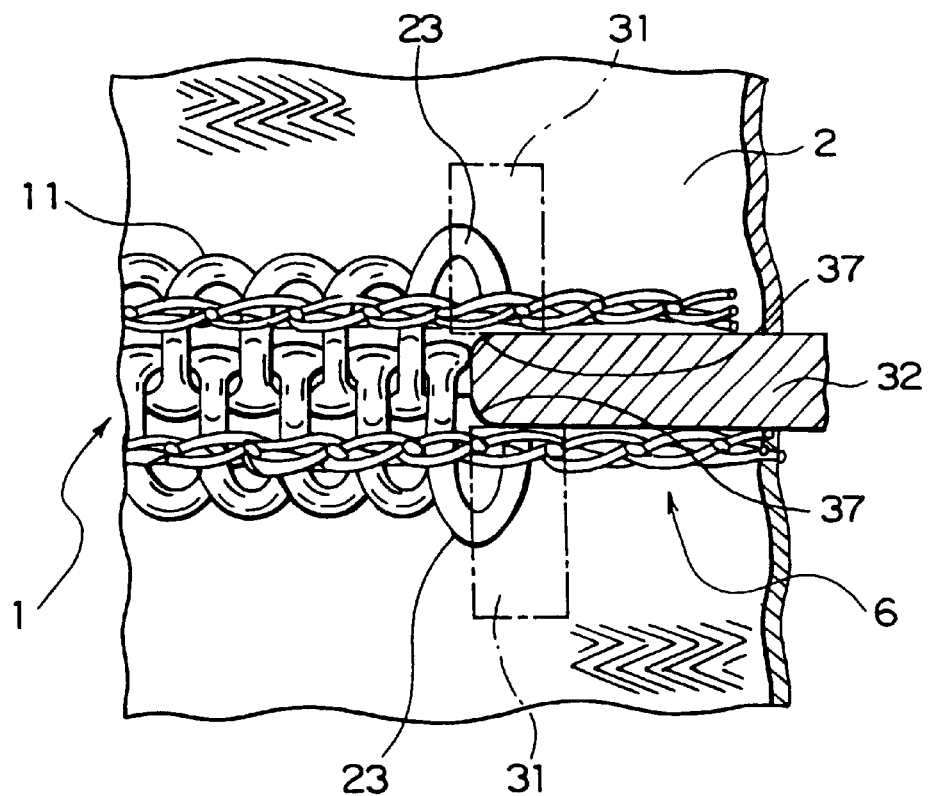
FIG. 26 is a partial plan view showing a step of lowering the pushing member into contact with a space portion of a fastener chain according to another embodiment.
Figure 27:
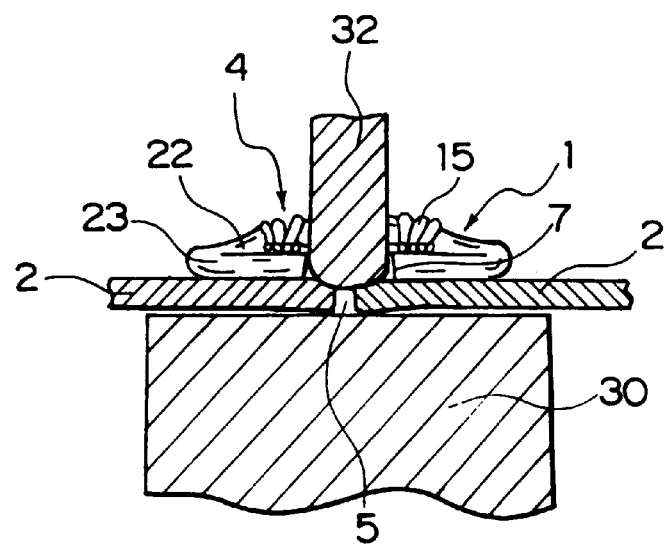
FIG. 27 is a sectional view of the processing step of the fastener chain.
Figure 28:
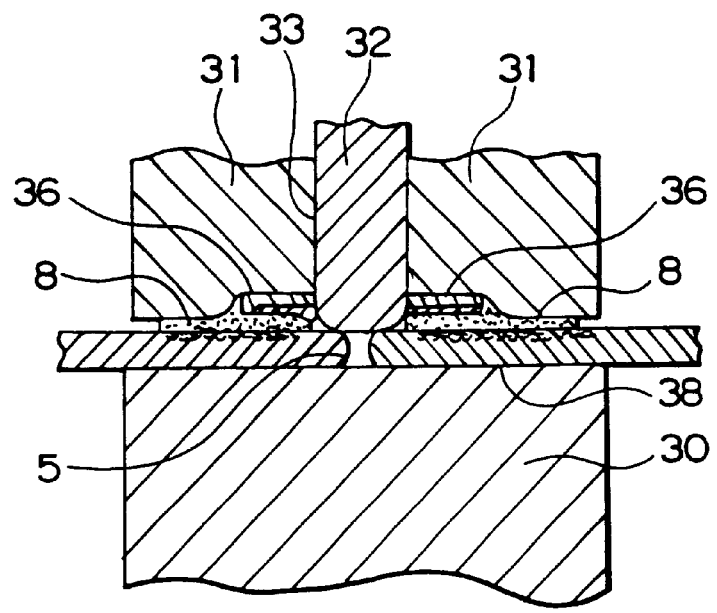
FIG. 28 is a sectional view showing a step of heating and pressing the fastener chain.

FIGS. 26 to 28 show an embodiment of forming an end of the coil-shaped fastener elements 11 in the fastener chain in which the coil-shaped fastener elements 11 are sewed directly onto a side edge portion 5 of a fastener tape 2 with sewing yarns 15. When the coil-shaped fastener elements 11 are cut and removed to produce a space portion 6 in the fastener chain shown in FIG. 14, a cut end portion 7 provided in a leg portion 22 of the end of the coil-shaped fastener elements 11 protrudes from the sewing yarns 15 toward the side edge portion 5.

As shown in FIGS. 26 and 27, the fastener chain in this state is sent to the die 30, and the pushing member 32, which has a taper surface 37 at its end for inserting in the space portion 6 and a thickness equal to an interval of the sewing yarns 15 of the fastener chain, descends toward the die 30 from above. Then, the taper surface 37 comes into contact with the cut end portions 7 of the coil-shaped fastener elements 11 protruding from the side edge portions 5 of the fastener tapes 2 during a transportation of the fastener chain, whereby the taper surface 37 guides the cut end portions 7 and pushes them inward of the fastener tape 2 to the sewing yarns 15 as the fastener chain is moved. As, a result, the inverted portions 23 are pushed out sideways of the sewing yarns 15. Alternatively, when the pushing member 32 descends with respect to a halted fastener chain, with its tip and pushing the cut end portions 7 of the coil-shaped fastener elements 11 inward of the fastener tape 2.

With this state, the ultrasonic horn 31 opposing the pushing member 32 descends to the die 30. As shown in FIG. 28, the ultrasonic horn 31 is of a size equal to a single fastener element 11. The ultrasonic horn 31 has a guide groove 33 at its center through which the pushing member 32 can slide up and down, and a cut-out portion 36 disposed on each of opposite sides of the guide groove 33 at a position facing the die 30 for receiving and compressing the sewing yarns 15. Therefore, the coil-shaped fastener elements 11 and sewing yarns 15 are compressed and heated so that the leg portions 22 and inverted portions 23 are fused. As a result, the coil-shaped fastener elements 11 are fused to the fastener tape 2.

The compression and heating of the sewing yarns 15 may be carried out by adjustment to such a degree that the sewing yarns 15 are not cut off. As a result, as shown in FIG. 16, the fused portions 8 can be formed at the ends of the coil-shaped fastener elements 11.

Finally, the apparatus for forming an end of the slide fastener chain according to the present invention will now be described. The apparatus is provided with a hauling mechanism of a known injection molding apparatus for hauling down a space portion of the continuous slide fastener chain in order to mold an upper stopper device and a separable stopper device to the space portion (see, fox example, Japanese patent publication No. Hei 1-28564), or a hauling mechanism for hauling down a space portion of the continuous slide fastener chain in order to simultaneously attach an upper stopper device and a lower stopper device to the space portion, or a hauling mechanism for hauling it down in order to simultaneously mold an upper stopper device, a lower stopper device or a box pin and separable pin of a separable stopper device to the space portion of the continuous slide fastener chain (see, for example, Japanese patent Laid-open publication No. Sho 57-89803).

Figure 30:
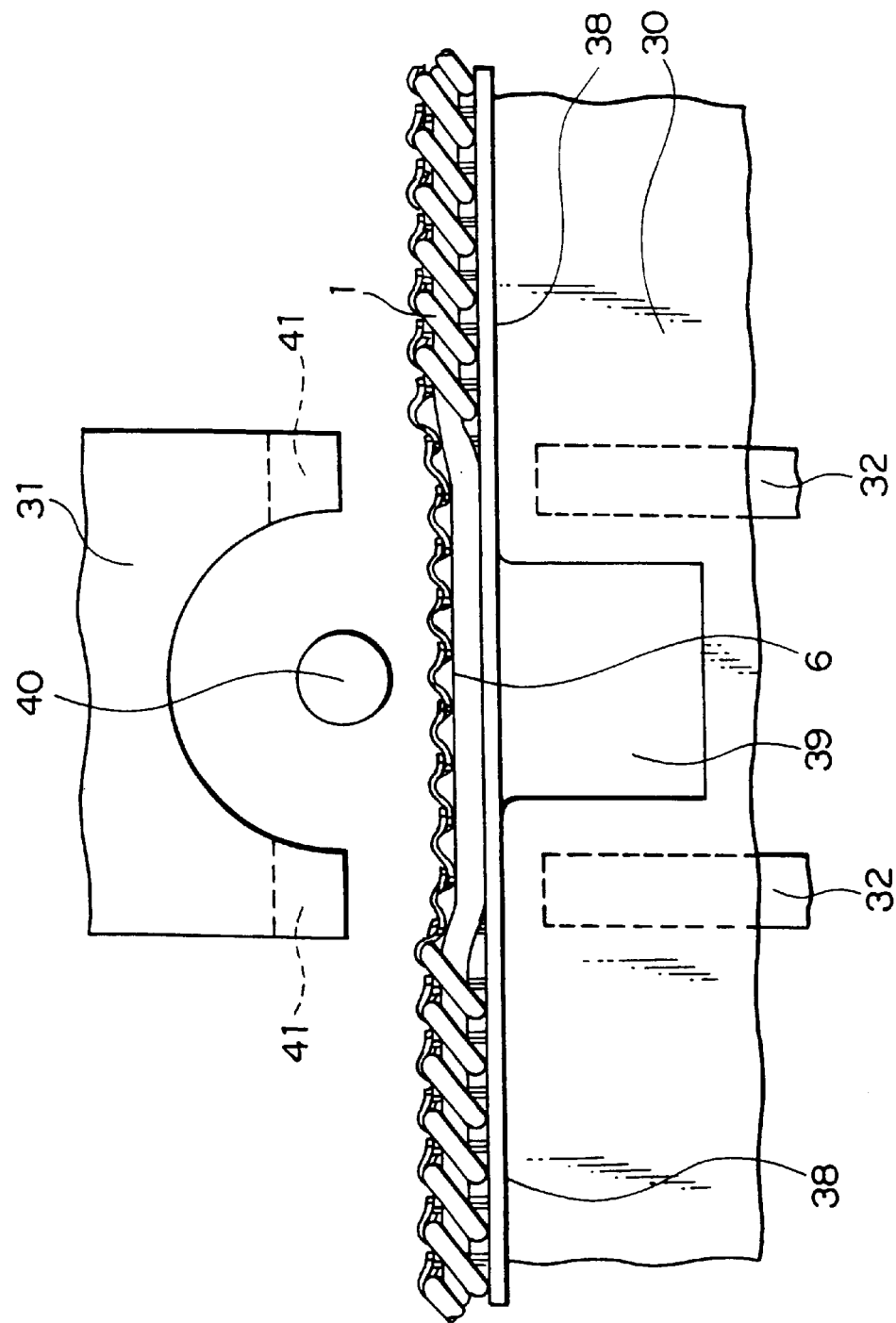
FIG. 30 is a front view schematically showing an apparatus for forming the end of the fastener chain.

As shown in FIG. 30, a transfer path 38 is formed on an upper surface of a die 30 for transferring the continuous slide fastener chain with space portions 6. The transfer path 38 is shallowly grooved so as to prevent the continuous slide fastener chain from being laterally moved. The transfer path 38 is formed with a gap portion 39 at its center, and an arm 40 that is movable up and down is provided so as to come in and out of the gap portion 39. The arm 40 has a shape that can push down the space portion 6 of the continuous slide fastener chain being transferred into the gap portion 39.

Figure 23:
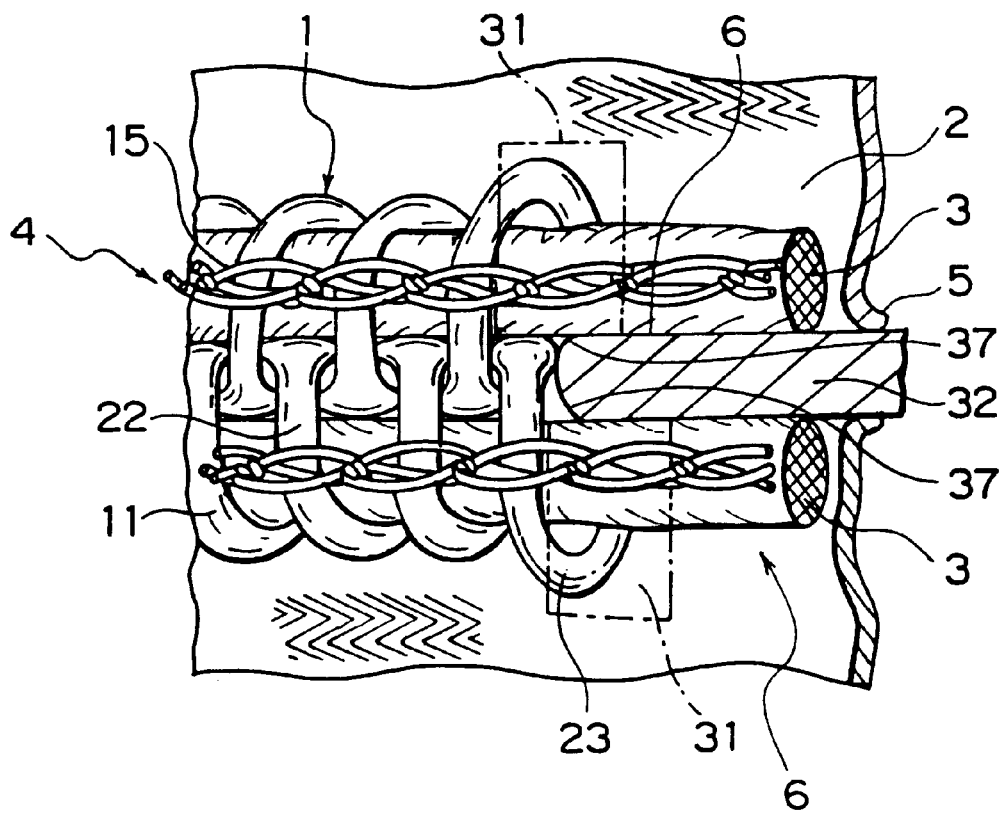
FIG. 23 is a partial plan view showing a step of raising and inserting a pushing member into a space portion of a fastener chain according to the invention.

A pair of pushing members 32 as shown in FIGS. 23 and 24 are disposed in front and back of the gap portion 39 of the transfer path 38. The pushing members 32 are movable up and down to project to the transfer path 38 so as to project into the space portions 6 of the continuous slide fastener chain. Above the pushing members 32 disposed at the transfer path 38, a ultrasonic horn 31 as shown in FIGS. 23 and 25 is disposed at an interval equal to a thickness of the pushing member 32 for moving up and down so as to move toward and away from the linear fastener elements 1 of the continuous slide fastener chain. The ultrasonic horn 31 has generally an arc shape as shown in FIG. 30.

On opposite sides of a guide groove 33 for receiving the pushing members 32 at the transfer path 38, a pair of recessed portions 35 as shown in FIG. 24 are provided for bending and accommodating side edge portions 5 of a pair of fastener tapes 2. The ultrasonic horn 31 disposed above is provided with a pair of cut-out portions 36 as shown in FIG. 25 on opposite sides of an insertion groove 41 for receiving the pushing members 32. Therefore, the ultrasonic horn 31 can form and compress core threads 3, fixing yarns 4 such as sewing yarns 15 or warp knitting yarns 18, or blades 9 to the fastener tapes 2 when it descends to the die 30.

Figure 31:
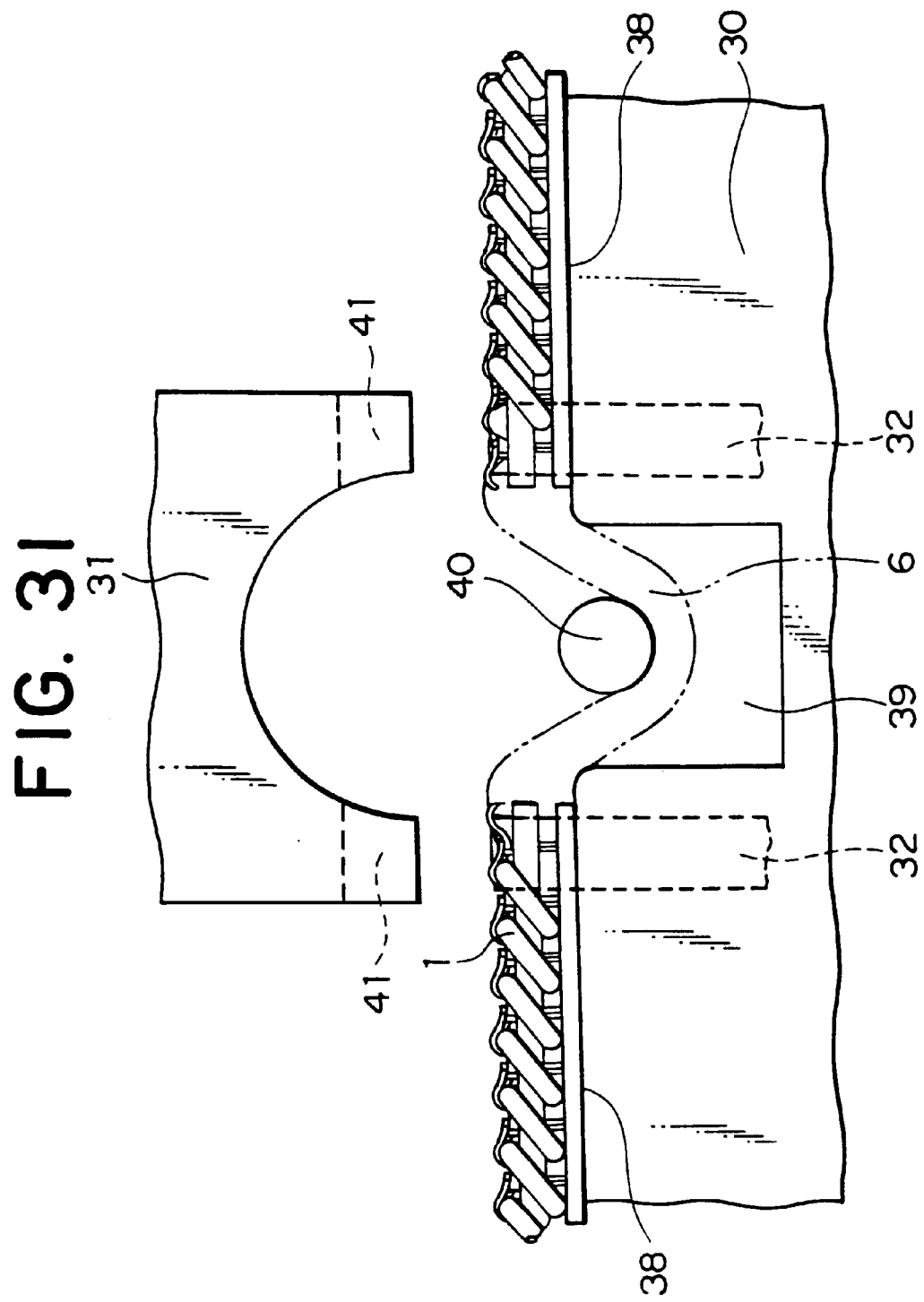
FIG. 31 is a front view showing a state in which an arm and a pushing member of the apparatus are actuated.

In the apparatus having such a structure, when the space portion 6 of the continuous slide fastener chain transferred is located on the transfer path 38 as shown in FIG. 30, the pushing members 32 ascends to project from the die 30 into the space portion 6. Further, the arm 40 descends to push down the continuous slide fastener chain into the gap portion 39 as shown in FIG. 31 until the cut end portions 7 of the linear fastener elements 1 at the space portion 6 come into contact with the pushing members 32, and then it is set.

Figure 32:
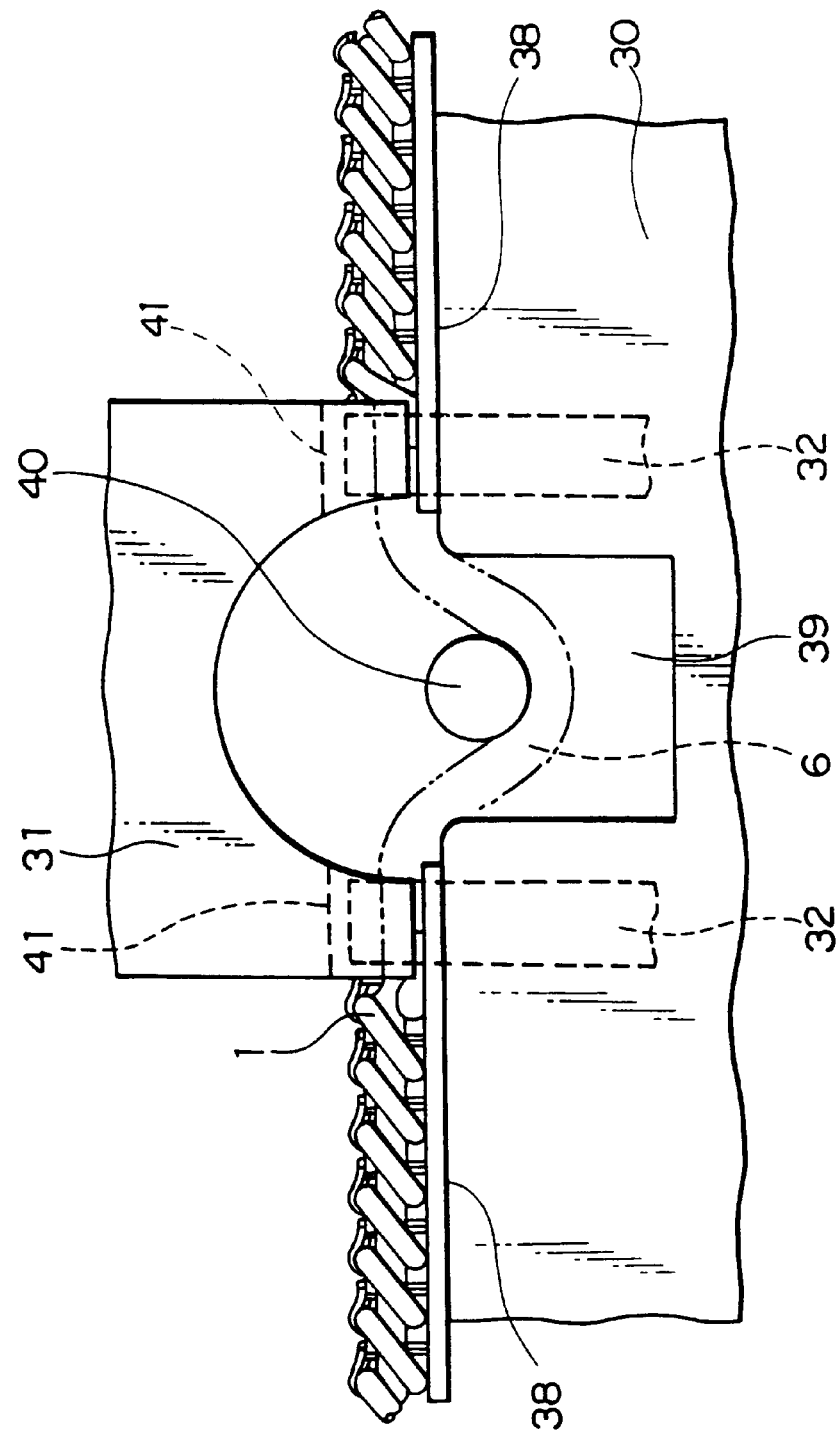
FIG. 32 is a front view showing a state in which a ultrasonic horn of the apparatus is actuated.
Figure 33:
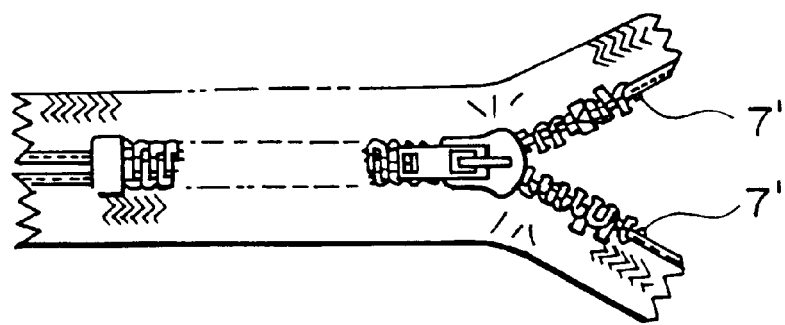
FIG. 33 is a plan view of a conventionally used slide fastener.
Figure 34:
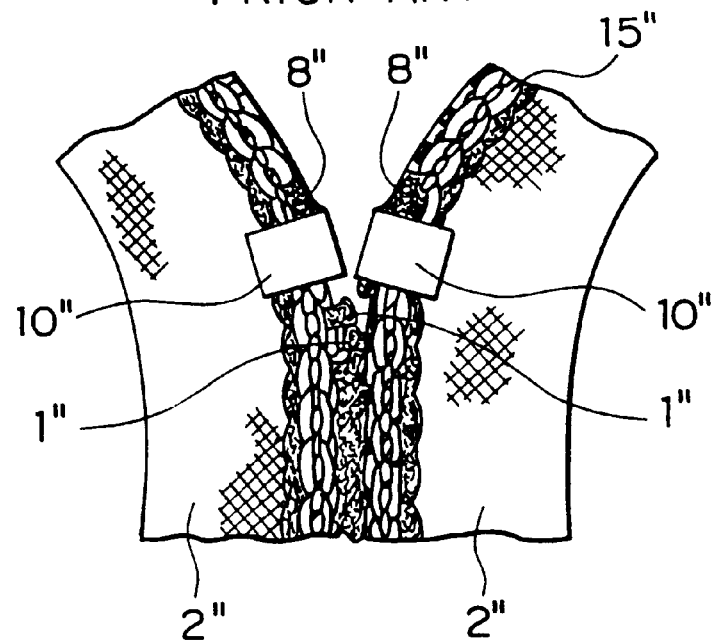
FIG. 34 is a plan view of a known slide fastener.

In this set state, the ultrasonic horn 31 descends to the die 30 as shown in FIG. 32, by which the cut end portions 7 of the linear fastener elements 1 of thermoplastic resin are pressed and formed onto the fastener tapes 2 by the ultrasonic processing to form fused portions 8 in front and back of the space portion 6 of the continuous slide fastener chain. Upon this forming is completed, the ultrasonic horn 31 ascends, and the arm 40 ascends, and at the same time the pushing members 32 descends to retreat from the transfer path 38. Then, the continuous slide fastener chain is transferred to the next processing apparatus.

The continuous slide fastener chain with the fused portions 8 formed by fusing the cut end portions 7 at the ends of the linear fastener elements by the apparatus as mentioned above is then processed by the next processing apparatus. Specifically, one pair of the fused portions 8 formed in front or back of the space portion 6 of the fastener chain are attached or molded with an upper stopper device at a position adjacent to the fused portions 8 or so as to cover the fused portions 8, while the other pair of the fused portions 8 of the fastener chain are attached or molded with a lower stopper device in the same manner, thus completing the fastener chain. Or, while one pair of the fused portions 8 formed in front or back of the space portion 6 of the fastener chain are attached or molded with an upper stopper device, the other pair of the fused portions 8 of the fastener chain may be attached or molded with a box pin and separable pin of a separable stopper device so as to cover the fused portions 8, thus, completing the fastener chain.

The slide fastener chain and the method for forming the end of the slide fastener chain of the present invention has such a structure as described above, by which the following effects can be achieved.

According to the first aspect of the present invention, there is provided a slide fastener chain including linear fastener elements 1 of thermoplastic resin attached to a side edge portion 5 of a fastener tape 2, wherein the end of the linear fastener elements 1 has a fused portion 8 formed by fusing the fastener element 1 at said end to the fastener tape 2 by heating in such a manner that a cut end portion 7 of the end of the linear fastener elements 1 is located inward of the side edge portion 5 of the fastener tape 2. As a result, the end of the linear fastener elements 1 in the fastener chain are fixed integrally to the fastener tape 2 so that the cut end portion 7 at the end of the fastener chain never protrudes outward from the side edge portion 5 of the fastener tape 2.

Therefore, a safety fastener chain which never injures the skin of a wearer or catch on the underwear can be achieved, thus this fastener chain never gives a feeling of a physical discomfort even when it is used for a long term.

Further, according to the first aspect of the present invention, the end of the linear fastener elements has the fused portion 8 formed by fusing the fastener element 1 at said end to the fastener tape 2 by heating in such a manner that the cut end portion 7 of said end of the linear fastener elements 1 is pushed inward of the side edge portion 5 of the fastener tape 2. Therefore, because the cut end portion 7 at the end of the linear fastener elements 1 is pushed positively inward of the fastener tape 2, the leg portion 22 of the linear fastener elements 1 located below the core thread 3 or fixing yarns 4 is exposed at a side of the inverted portion 23 so that a fused area of the linear fastener elements 1 at the end can be larger. Thus, the fused portion 8 that is easy to be fused and excellent in strength can be formed.

Furthermore, according to the first aspect of the present invention, the cut end portion 7 of the end of the linear fastener elements 1 is provided in the leg portion 22 of the fastener element 1 at said end which faces and is in contact with the fastener tape 2, and the fused portion 8 is formed by fusing the inverted portion 23 or the leg portion 22, or both the inverted portion 23 and the fused portion 8 of the fastener element 1 at said end to the fastener tape 2 by heating. Therefore, an effective fusing means can be selected appropriately depending on the size of the linear fastener elements 1. For example, for a fastener element 1 of large size, the inverted portion 23 may be fused, and for a fastener element 1 of small size, the leg portion 22 and the inverted portion 23 may be fused. For a fastener element 1 employing a blade 9, the leg portion 22 may be fused. Thus, the cut end portion 7 can be fused securely depending on the configuration or disposition of the fastener element 1.

Still further, according to the first aspect of the present invention, the cut end portion 7 of the end of the linear fastener elements 1 is provided in the upper leg portion 22 at said end which is disposed apart from a surface of the fastener tape 2, and the fused portion is formed by fusing the upper leg portion 22 and the inverted portion 23 to the fastener tape 2 by heating. Therefore, the space portion 6 can be produced in the fastener chain easily without considering the shape of the coil shape or zigzag shape fastener elements 1, for example, a coiling direction of the fastener elements 1 or upper or lower disposition of the inverted portion 23. Even when there is any cut end portion 7 in the upper leg portion 22, the fused portion 8 can be formed easily.

Still further, according to the first aspect of the present invention, the cut end portion 7 of the end of the linear fastener elements 1 is located below the core thread 3 or the blade 9 attached at the linear fastener elements 1, and the cut end portion 7 is fused to the fastener tape 2 while being nipped by the core thread 3 or the blade 9 and the fastener tape 2. Therefore, this aspect is most suitable for linear fastener elements 1 employing the core thread 3 or the blade 9. The fused portion 8 can be formed in a firm and stable configuration together with the core thread 3 or the blade 9, and the fused out and portion 7 is covered by the core thread 3 or the blade 9 so that it is never exposed on a surface of the fastener chain. Therefore, a safety configuration that does not contact with the skin of a wearer or his underwear can be realized.

Still further, according to the first aspect of the present invention, the cut end portion 7 of the end of the linear fastener elements 1 is located below the fixing yarns 4 for fixing the linear fastener elements 1 onto the fastener tape 2, and the cut end portion 7 is fused to the fastener tape 2 while being nipped by the fixing yarn 4 and the fastener tape 2. Therefore, this aspect is most suitable for linear fastener elements 1 of small size sewed with the sewing yarns 15, or linear fastener elements 1 woven or knitted with the warp yarns 16 or the warp knitting yarns 18. The fused portion 8 can be formed in a firm and stable configuration together with the sewing yarns 15, warp yarns 16 or warp knitting yarns 18, and the fused cut end portion 7 is covered with the fixing yarns 4 so that it is never exposed on a surface of the fastener chain. Thus, a safety configuration that does not contact with the skin of a wearer or his underwear can be realized.

Still further, according to the first aspect of the present invention, an upper stopper device 10, a lower stopper device or a set of box pin and separable pin of a separable stopper device is attached to the fastener elements 1 located adjacent to the fused portion a formed on the linear fastener elements 1 or located so as to cover the fused portion a formed on the linear fastener elements 1. Therefore, the end of the linear fastener elements 1 can be formed to be a stable fused portion 8, and the upper stopper device 10, the lower stopper device or the box pin and separable pin of a separable stopper device can be firmly fixed at a position adjacent to the fused portion 8 or so as to cover the fused portion 8. Thus it is possible to achieve the slide fastener chain with upper and lower or separable stopper devices in durable and safe configurations.

According to the second aspect of the present invention, there is provided a method for forming an end of a slide fastener chain in which the linear fastener elements 1 made of thermoplastic resin are attached to a side edge portion 5 of a fastener tape 2, the method comprising steps of cutting a leg portion 22 at said end of the linear fastener elements 1 to form a cut end portion 7; pushing the cut end portion 7 inward of the side edge portion 5 of the fastener tape 2; and while keeping said cut end portion 7 being pushed, fusing said end of the linear fastener elements 1 to the fastener tape 2 by heating. Therefore, the cut end portion 7 can be formed at the end of the linear fastener elements 1 in the fastener chain, and the cut end portion 7 can be disposed securely inward of the fastener tape 2. Further, while this inward position, the linear fastener elements 1 can be fused to the fastener tape 2 easily.

Further, according to the second aspect of the present invention, the method comprises steps of: forwarding a pair of pushing members 32 into the space portion 6 of the fastener chain; hauling the fastener chain at the space portion 6 so as to locate front and back cut end portions 7 of the space portion 6 at the pushing members 32 and at the same time, pressing the linear fastener elements 1 to be separated in lateral directions thereof while contacting the cut end portions 7 of the linear fastener elements 1 with the pushing members 32; and pushing each of the cut end portions 7 inward of the side edge portion 5 of the fastener tape 2. Therefore, it possible to achieve accurate and simple preparatory process of forming the fused portions 8 in front and back of the space portion 6 of the fastener chain.

Furthermore, according to the second aspect of the present invention, the method further includes a step of, with the cut end portion 7 of the end of the linear fastener elements 1 being pushed inward of the side edge portion 5 of the fastener tape 2, fusing the inverted portion 23 of the linear fastener elements 1 at the end to the fastener tape 2 by heating. Therefore, the inverted portion 23 appearing by reaction when the cut end portion 7 at the end of the linear fastener elements 1 is pushed inward of the fastener tape 2 positively can be brought into contact with a heating member without being disturbed by the core thread 3 or the fixing yarns 4. Thus, the inverted portion 23 can be fused to the fastener tape 2 easily.

Still further, according to the second aspect of the present invention, the method further includes a step of pressing the side edge portions 5 of a pair of the fastener tapes 2 in lateral directions thereof by the pushing member 32 having a taper surface 37 at an end thereof when the pushing member 32 ascends to contact with the side edge portions 5, and bending the side edge portions 5 in a predetermined direction to enlarge a gap between the fastener tapes 2 while pushing the cut end portions 7 inward of the side edge portions 5. Therefore, by raising the pushing member 32 in contact with the side edge portions 5 of the fastener tapes 2, the cut end portions 7 at the ends of the linear fastener elements 1 can be pushed inward of the fastener tapes 2 easily.

Still further, according to the second aspect of the present invention, the method further includes a step of pressing the cut end portions 7 formed at said ends of the linear fastener elements 1 attached to the side edge portions 5 of a pair of the fastener tapes 2 fox separating them in lateral directions thereof by the pushing member 32 when the pushing member 32 descends to contact with the cut end portions 7, and pushing the cut end portions 7 inward of the side edge portions 5. Therefore, by lowering the pushing member 32 against the cut end portions 7 to bring it into contact therewith, the cut end portions 7 at the end of the linear fastener elements 1 can be pushed inward of the fastener tapes 2 easily.

According to the third aspect of the present invention, the transfer path 38 is formed on a top face of a die 30 for transferring a continuous slide fastener chain having space portions 6, a gap portion 39 is provided in a middle portion of the transfer path 36, an arm 40 is provided so as to movable in and out of the gap portion 39, a pair of pushing members 32 are disposed in front and back of the gap portion 39 so as to projecting toward the transfer path 38, and a ultrasonic horn 31 is disposed so as to face parts of the die 30 corresponding to the pushing members 32 and movable toward and away from the die 30. Therefore, it is possible to easily and efficiently form the fused portions 8 in front and back of the space portion 6 of the continuous fastener chain, thus the productivity can be enhanced.

Further, according to the third aspect of the present invention, the pushing member 32 has a taper surface 37 at its end surface to contact with the linear fastener elements 1. Therefore, the pushing member 32 can catch the cut end portions 7 of the linear fastener elements 1 accurately and smoothly.

Furthermore, according to the third aspect of the present invention, the die 30 is provided with a guide groove 33 through which the pushing member 32 is slidably movable up and down so as to come in and out of the guide groove 33. Therefore, the pushing member 32 can be actuated smoothly with respect to the die 30 and can accurately stop the transferring of the continuous slide fastener chain at the end-forming position.

Still further, according to the third aspect of the present invention, the ultrasonic horn is provided with an insertion groove 41 in which the pushing member 32 can be inserted. Therefore, it is possible that the pushing member 32 and the ultrasonic horn 31 are smoothly actuated so as to face with each other in an accurate manner.

Still further, according to the third aspect of the present invention, the die 30 is provided with a recessed portion 35 on each of opposite sides of an end portion of the guide groove 33 so that the side edge portion 5 of the fastener tape 2 can be bent and accommodated in the recessed portion 35. Therefore, the fastener tape 2 can not obstruct the cut end portion 7 to be pushed in, thus the end of the slide fastener can be formed with good appearance and quality.

Still further, according to the third aspect of the present invention, a cut-out portion 36 is provided on each of opposite sides of an end portion of the insertion groove 41 so that a core thread 3, fixing yarn 4 or blade 9 can be accommodated and pressed in the cut-out portion 36. Therefore, the end of the slide fastener can be formed at a high speed, and the resultant slide fastener is good in quality.

Still further, according to the third aspect of the present invention, the ultrasonic horn 31 is provided with a guide groove 34 through which the pushing member 32 is slidably movable up and down so that the pushing member 32 can come in and out of the guide groove 34. Therefore, the pushing member 32 can be actuated smoothly with respect to the ultrasonic horn 31 and can accurately stop the transferring of the continuous slide fastener chain at the end-forming position.

As described above, the effects that can be achieved by the present invention are very remarkable.

What is claimed is:

1. A method for forming an end of a slide fastener chain in which linear fastener elements made of thermoplastic resin are attached to a side edge portion of a fastener tape, said method comprising steps of:

cutting a leg portion at an end of the linear fastener elements to form a cut end portion;

pushing the cut end portion from a first position where the cut end portion protrudes from the side edge of the fastener tape to a second position where the cut end is positioned inward of the side edge portion of the fastener tape; and while keeping said cut end portion being pushed, fusing said end of the linear fastener elements to the fastener tape by heating.

2. A method for forming an end of a slide fastener chain according to claim 1, further comprising steps of:

forwarding a pair of pushing members into the space portion of the fastener chain;

hauling the fastener chain at the space portion so as to locate front and back cut end portions of the space portion at the pushing members and at the same time, pressing the linear fastener elements to be separated in lateral directions thereof while contacting the cut end portions of the linear fastener elements with the pushing members; and pushing each of the cut end portions inward of the side edge portion of the fastener tape.

3. A method for forming an end of a slide fastener chain according to claim 1, further comprising a step of, with the cut end portion of said end of the linear fastener elements being pushed inward of the side edge portion of the fastener tape, fusing an inverted portion of the linear fastener element at said end to the fastener tape by heating.

4. A method for forming an end of a slide fastener chain according to claim 1, further comprising steps of:

pressing the side edge portions of a pair of the fastener tapes in lateral directions thereof by pushing members when the pushing members ascend to contact with the side edge portions; and bending the side edge portions in a predetermined direction to enlarge a gap between the fastener tapes and at the same time, pushing the cut end portions inward of the side edge portions.

5. A method for forming an end of a slide fastener chain according to claim 1, further comprising steps of:

pressing and separating the cut end portions formed at said ends of the linear fastener elements attached to the side edge portions of a pair of the fastener tapes in lateral directions thereof by pushing members when the pushing members descend to contact with the cut end portions; and pushing the cut end portions inward of the side edge portions.

* * * * *